US012355140B2

(12) United States Patent
Morimoto et al.

(10) Patent No.: US 12,355,140 B2
(45) Date of Patent: Jul. 8, 2025

(54) ANTENNA DEVICE

(71) Applicant: AGC Inc., Tokyo (JP)

(72) Inventors: Yasuo Morimoto, Tokyo (JP); Akira Kumagai, Tokyo (JP); Takeshi Motegi, Tokyo (JP); Kazuhiko Niwano, Tokyo (JP); Kouichirou Takahashi, Tokyo (JP)

(73) Assignee: AGC Inc., Tokyo (JP)

( * ) Notice: Subject to any disclaimer, the term of this patent is extended or adjusted under 35 U.S.C. 154(b) by 140 days.

(21) Appl. No.: 17/812,849

(22) Filed: Jul. 15, 2022

(65) Prior Publication Data

US 2022/0352620 A1 Nov. 3, 2022

Related U.S. Application Data

(63) Continuation of application No. PCT/JP2021/000849, filed on Jan. 13, 2021.

(30) Foreign Application Priority Data

Feb. 3, 2020 (JP) ................................ 2020-016621

(51) Int. Cl.
*H01Q 1/24* (2006.01)
*H01Q 9/06* (2006.01)
*H01Q 19/30* (2006.01)

(52) U.S. Cl.
CPC ............. *H01Q 1/243* (2013.01); *H01Q 9/065* (2013.01); *H01Q 19/30* (2013.01)

(58) Field of Classification Search
CPC ........ H01Q 1/243; H01Q 9/065; H01Q 19/30; H01Q 1/085; H01Q 1/364; H01Q 9/30;
(Continued)

(56) References Cited

U.S. PATENT DOCUMENTS 2,417,895 A * 3/1947 Wheeler .................. H01Q 9/16 343/822
3,122,745 A * 2/1964 Ehrenspeck ......... H01Q 19/185 343/837
(Continued)

FOREIGN PATENT DOCUMENTS

CN 203366269 U * 12/2013
CN 116111335 A * 5/2023 ............. H01Q 1/007
(Continued)

OTHER PUBLICATIONS

International Search Report issued Apr. 13, 2021 in PCT/JP2021/000849, filed on Jan. 13, 2021, 2 pages.

*Primary Examiner* — Hai V Tran
*Assistant Examiner* — Jordan E. DeWitt
(74) *Attorney, Agent, or Firm* — Oblon, McClelland, Maier & Neustadt, L.L.P.

(57) ABSTRACT

An antenna device including a transparent antenna element that can be provided at a position visible from outside of a transparent cover of an electronic apparatus is provided. An antenna device includes a flexible substrate that is transparent and that is to be provided on an inner surface side opposite to an outer surface of a transparent cover, made of glass or resin, of an electronic apparatus, and an antenna element that is transparent and that is to be provided at a position, of the flexible substrate, that is visible from outside of the transparent cover, the antenna element having a directivity oriented toward an outside of the electronic apparatus.

22 Claims, 37 Drawing Sheets

(58) Field of Classification Search
CPC .. H01Q 11/105; H01Q 13/085; H01Q 13/106; H01Q 1/38; H01Q 1/44
See application file for complete search history.

(56) References Cited

U.S. PATENT DOCUMENTS

| | | | | | |
|---|---|---|---|---|---|
| 3,438,043 | A * | 4/1969 | Ehrenspeck | H01Q 19/185 | 343/837 |
| 3,681,769 | A * | 8/1972 | Perrotti | H01Q 21/062 | 343/822 |
| 4,183,027 | A * | 1/1980 | Ehrenspeck | H01Q 5/40 | 343/726 |
| 2013/0328732 | A1* | 12/2013 | Shimizu | G06F 3/045 | 29/832 |
| 2015/0068032 | A1* | 3/2015 | Cok | G06F 3/0445 | 29/846 |
| 2016/0134008 | A1* | 5/2016 | Kim | H01Q 21/28 | 343/711 |
| 2016/0190678 | A1* | 6/2016 | Hong | H01Q 1/364 | 343/700 MS |
| 2019/0113609 | A1* | 4/2019 | Baheti | H01Q 9/0457 | |
| 2020/0127378 | A1* | 4/2020 | Kim | H01P 3/06 | |
| 2020/0266542 | A1* | 8/2020 | Mu | H10K 59/00 | |

FOREIGN PATENT DOCUMENTS

| | | | |
|---|---|---|---|
| JP | 2003032030 | A * | 1/2003 |
| JP | 2008-187741 | A | 8/2008 |
| JP | 2017175541 | A * | 9/2017 |
| JP | 2019-506771 | A | 3/2019 |
| JP | 2020202593 | A * | 12/2020 |
| WO | WO 2014/203976 | A1 | 12/2014 |

* cited by examiner z=0 mm z=2 mm z=4 mm

ANTENNA DEVICE

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2021/000849 filed on Jan. 13, 2021 and designating the U.S., which claims priority to Japanese Patent Application No. 2020-016621 filed on Feb. 3, 2020. The entire contents of the foregoing applications are incorporated herein by reference.

BACKGROUND OF THE INVENTION

1. Field of the Invention

The present invention relates to an antenna device.

2. Description of the Related Art

There is a conventional antenna device used for an electronic apparatus such as a smartphone, which includes a ground plane, a sheet conductor that has a section that faces the ground plane with a gap therebetween, a feed element connected to a feeding point with the ground plane serving as the ground therefor, and a linear radiating element connected to the sheet conductor, wherein the feed element supplies power to the radiating element in a contactless manner, so that the radiating element functions as a radiating conductor (for example, see Patent Literature 1.).

CITATION LIST

Patent Literature

PTL 1: International Publication No. 2014/203976

SUMMARY OF THE INVENTION

Technical Problem

However, the conventional antenna device is not suitable for the arrangement at the position visible from the outside of a transparent cover of the electronic apparatus because the arrangement at the position visible from the outside of the transparent cover of the electronic apparatus reduces the visibility of the display panel.

It is therefore an object to provide an antenna device including a transparent antenna element that can be provided at a position visible from the outside of a transparent cover of an electronic apparatus.

Solution to Problem

An antenna device according to an embodiment of the present invention includes a flexible substrate that is transparent and that is to be provided on an inner surface side opposite to an outer surface of a transparent cover, made of glass or resin, of an electronic apparatus, and an antenna element that is transparent and that is to be provided at a position, of the flexible substrate, that is visible from outside of the transparent cover, the antenna element having a directivity oriented toward an outside of the electronic apparatus.

Advantageous Effects of Invention

An antenna device including a transparent antenna element that can be provided at a position visible from the outside of a transparent cover of an electronic apparatus can be provided.

DETAILED DESCRIPTION OF THE PREFERRED EMBODIMENTS

Hereinafter, an embodiment to which an antenna device according to the present invention is applied is explained.

Embodiment

Figure 1:
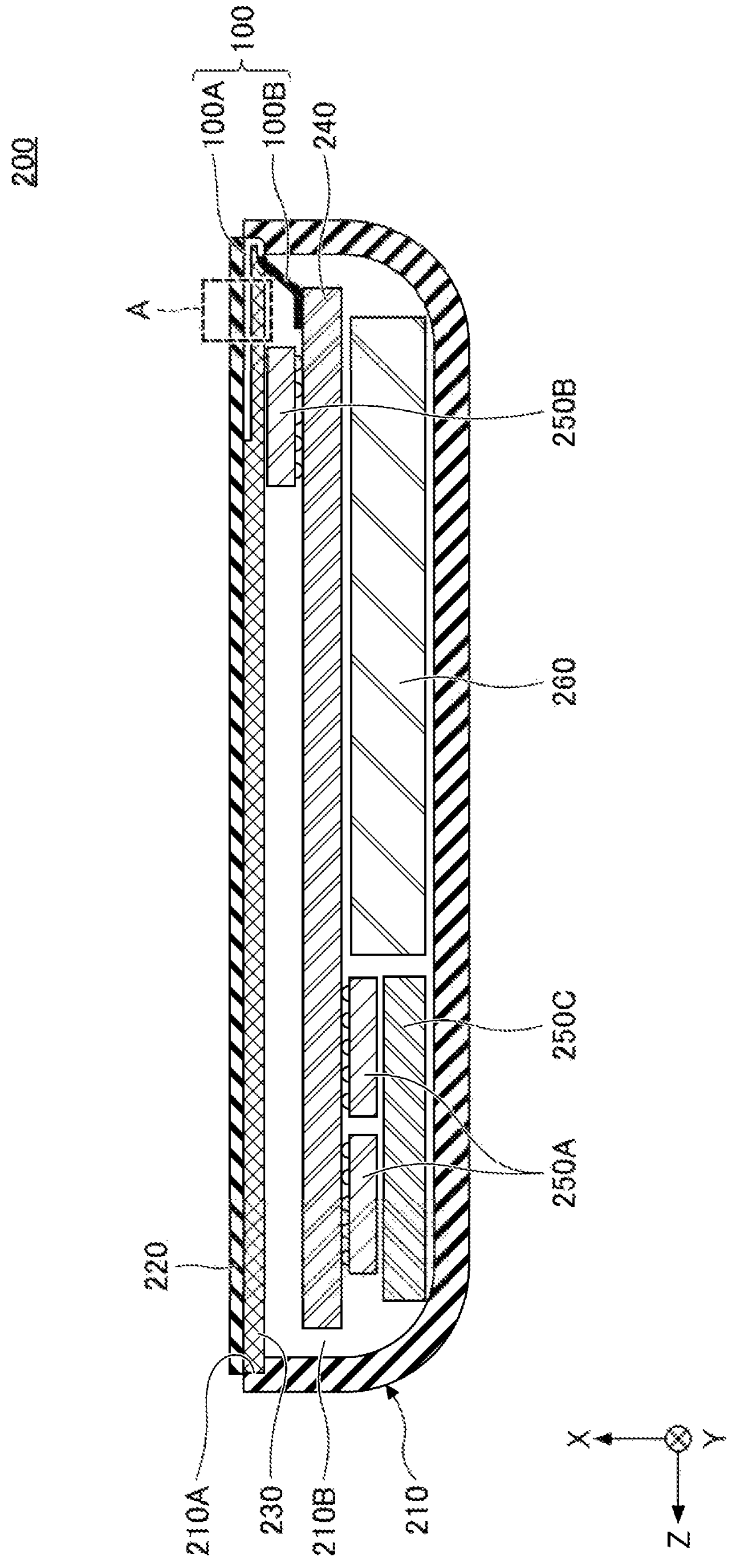
FIG. 1 is a drawing illustrating an example of a cross-section of an electronic apparatus 200 of an antenna device 100.
Figure 2:
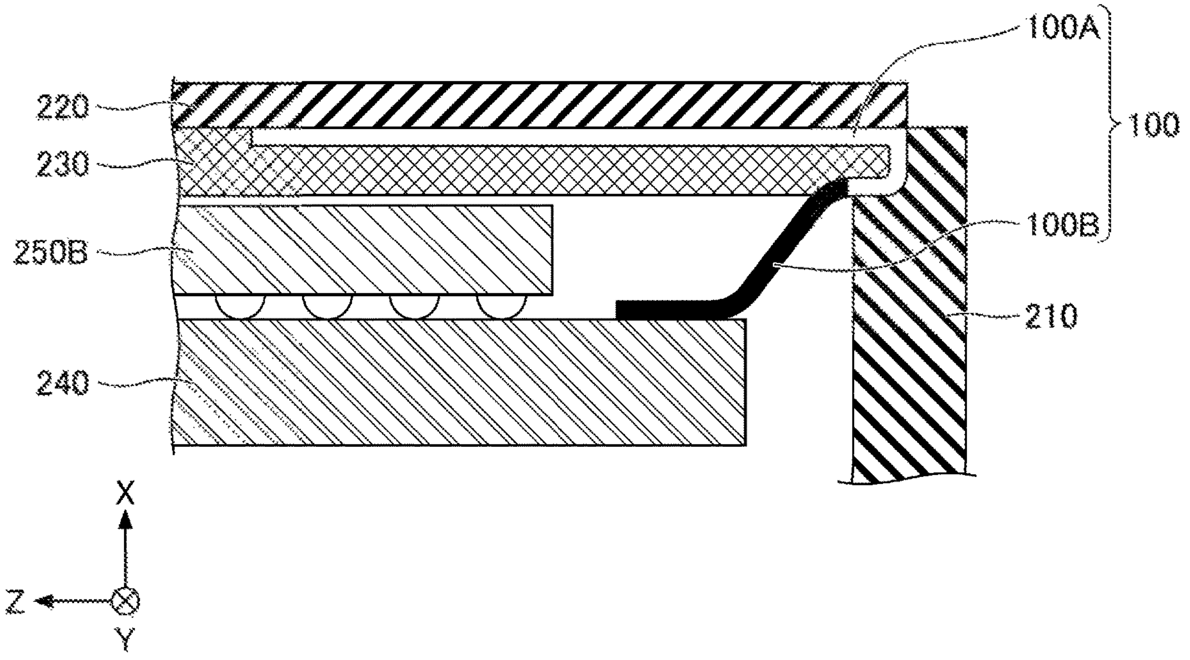
FIG. 2 is an enlarged view of a portion of a cross-section of the electronic apparatus 200.

FIG. 1 is a drawing illustrating an example of a cross-section of an electronic apparatus 200 including an antenna device 100. FIG. 2 is an enlarged view of a portion of a cross-section of the electronic apparatus 200. Hereinafter, an XYZ coordinate system is defined for explanation. In the following explanation, a plan view refers to a view in the YZ plane. Furthermore, in the following explanation, an up-and-down direction in which +X direction side is the upper side and −X direction side is the lower side and a lateral direction (sideways) with respect to the up-and-down direction are used, but they do not represent the universal up-and-down direction and horizontal directions.

In the embodiment, deviations from directions such as parallel direction, perpendicular direction, orthogonal direction, horizontal direction, vertical direction, height direction, width direction, and the like are tolerated so long as the effects of the present invention are not impaired. Further, an X axis direction, a Y axis direction, and a Z axis direction represent a direction parallel to the X axis, a direction parallel to the Y axis, and a direction parallel to the Z axis, respectively. The X axis direction, the Y axis direction, and the Z axis direction are orthogonal to each other. The XY plane, the YZ plane, and the ZX plane are a virtual plane parallel to the X axis direction and the Y axis direction, a virtual plane parallel to the Y axis direction and the Z axis direction, and a virtual plane parallel to the Z axis direction and the X axis direction, respectively.

Further, in the following explanation, substantially the same configurations may be denoted with the same reference numerals, and redundant explanations may be omitted.

The antenna device 100 is suitable for transmitting and receiving electromagnetic waves of a high frequency band (For example, over 1 GHz to 300 GHz) such as microwave or millimeter wave. The antenna device 100 is applicable to a fifth generation mobile communication system (5G), a sixth generation mobile communication system (6G), or the like as an example, but the applicable system is not limited thereto. The fifth generation mobile communication system (5G) includes, for example, a 28 GHz band and a band less than 6 GHz (Sub6).

FIGS. 1 and 2 illustrate a portion 100A and a portion 100B of the antenna device 100. The portion 100A is an example of a first portion, and the portion 100B is an example of a second portion of the antenna device 100. For the ease of understanding of the positions of the portions 100A and 100B, the portion 100A is illustrated in white with an outline, and the portion 100B is illustrated in gray.

Although the detailed configuration of the antenna device 100 is described later, the antenna device 100 includes, for example, a flexible substrate, an antenna element, and a feeding line, and is bendable. In FIGS. 1 and 2, the antenna device 100 is bent to be folded between the portion 100A and the portion 100B. The portion 100B is further bent in the inside of a storing portion 210B.

The portion 100A is a portion where at least an antenna element is provided on the flexible substrate, and not only the antenna element but also a portion of the feeding line may be provided in the portion 100A. The portion 100B is a portion where at least a portion of the feeding line (the entire feeding line or the remaining portion of the feeding line other than a portion provided in the portion 100A) is provided on the flexible substrate.

The portion 100A of the antenna device 100 is provided on the upper side (display surface side) of a display panel included in a display operation unit 230. The portion 100A of the antenna device 100 is transparent because it is visible from the outside of the electronic apparatus 200 through the transparent cover 220. The portion 100B is provided on the rear side of the display operation unit 230 and is not visible from the outside of the electronic apparatus 200, and therefore, the portion 100B does not have to be transparent.

In FIGS. 1 and 2, the portion 100A of the antenna device 100 is illustrated between the transparent cover 220 and the display operation unit 230 for the convenience of explanation, but the portion 100A of the antenna device 100 is not limited to be provided between the display operation unit 230 and the transparent cover 220, and may be provided between any of a touch panel, a polarizing plate, and a display panel included in the display operation unit 230. The positional relationship between the portion 100A of the antenna device 100, the transparent cover 220, and the display operation unit 230 is described later.

The antenna device 100 has a directivity toward the outside of the electronic apparatus 200. The directivity of the antenna device 100 is the directivity of the main lobe. The directivity toward the outside means that the directivity of the main lobe of the antenna device 100 is oriented toward the outside of a housing 210 and the transparent cover 220 of the electronic apparatus 200. "Oriented toward the outside" means that, for example, the directivity is oriented toward, as seen from the inside of the electronic apparatus 200, +X direction of the transparent cover 220, a direction parallel to the YZ plane on the outside of the transparent cover 220, a direction between the +X direction of the transparent cover 220 and the direction parallel to the YZ plane on the outside of the transparent cover 220, or the like. When a portion of the housing 210 is made of a dielectric material, the housing may face the outside of the housing 210 through the portion made of the dielectric material.

The electronic apparatus 200 is, for example, an information processing terminal such as a smart phone, a tablet computer, or a notebook PC (Personal Computer). The electronic apparatus 200 is not limited to these, and may be, for example, a structure such as a pillar or a wall, a digital signage, an electronic apparatus including a display panel in a train, or an electronic apparatus including various display panels in a vehicle.

The electronic apparatus 200 includes, in addition to the antenna device 100, the housing 210, the transparent cover 220, the display operation unit 230, a circuit board 240, electronic components 250A and 250B, a battery 260, and the like. The display operation unit 230 has a display panel. As described above, the electronic apparatus 200, the electronic apparatus 200 may be an electronic apparatus that includes the housing 210, the transparent cover 220, and the display panel.

The housing 210 is a case made of, for example, metal and/or resin and covers the lower surface and the side surface of the electronic apparatus 200. The housing 210 has an opening portion 210A on the upper side, and a transparent cover 220 is attached to the opening portion 210A. The housing 210 has a storing portion 210B which is an internal space in communication with the opening portion 210A. The circuit board 240, electronic components 250A and 250B, the battery 260, and the like are accommodated in the storing portion 210B.

The transparent cover 220 is a transparent glass plate in a rectangular shape in a plan view, and has a size matching the opening portion 210A in a plan view. The transparent cover 220 is, for example, a flat glass plate. Although the transparent cover 220 is made of glass in this explanation, the transparent cover 220 may be made of resin.

When the transparent cover 220 is attached to the opening portion 210A of the housing 210, the storing portion 210B of the housing 210 is sealed.

The upper surface of the transparent cover 220 is an example of an outer surface of the transparent cover 220, and the lower surface of the transparent cover 220 is an example of an inner surface of the transparent cover 220. The display operation unit 230 is provided on the inner surface side of the transparent cover 220. From the outside of the electronic apparatus 200, the display operation unit 230 provided inside is visible through the transparent cover 220.

The display operation unit 230 is a composite object made by stacking a touch panel, a polarizing plate, a display panel, and the like. The electronic apparatus 200 allows GUI (Graphical User Interface) buttons and the like displayed on the display panel of the display operation unit 230 to be operated by touching the upper surface of the transparent cover 220. The user's operation is detected by the touch panel of the display operation unit 230.

The display panel is provided at the lowest side of the display operation unit 230. In a portion where the antenna device 100 is not present, the touch panel and the polarizing plate are stacked on the display panel. The order in which the touch panel and the polarizing plate are stacked is not particularly limited. In a portion where the antenna device 100 is present, the antenna device 100 is provided at any position on the upper side of the display panel.

The electronic components 250A, 250B are mounted on the circuit board 240. A feeding line or the like of a portion 100B of the antenna device 100 is connected to the circuit board 240. The circuit board 240 and the portion 100B may be connected by a connector, an ACF (Anisotropic Conductive Film), or the like, or may be connected by other components.

As an example, the electronic component 250A is a component that performs information processing related to the operation of the electronic apparatus 200, and is implemented by a computer including, for example, a CPU (central processing unit), RAM (random access memory), ROM (read only memory), HDD (hard disk drive), an input and output interface, an internal bus, and the like.

The electronic component 250B is, for example, a communication module connected to the portion 100B of the antenna device 100 via a wiring of the circuit board 240 and configured to process signals transmitted or received via the antenna device 100.

The battery 260 is a rechargeable secondary battery and supplies power necessary for the operation of the antenna device 100, the display operation unit 230, and the electronic components 250A, 250B, and the like.

Figure 3:
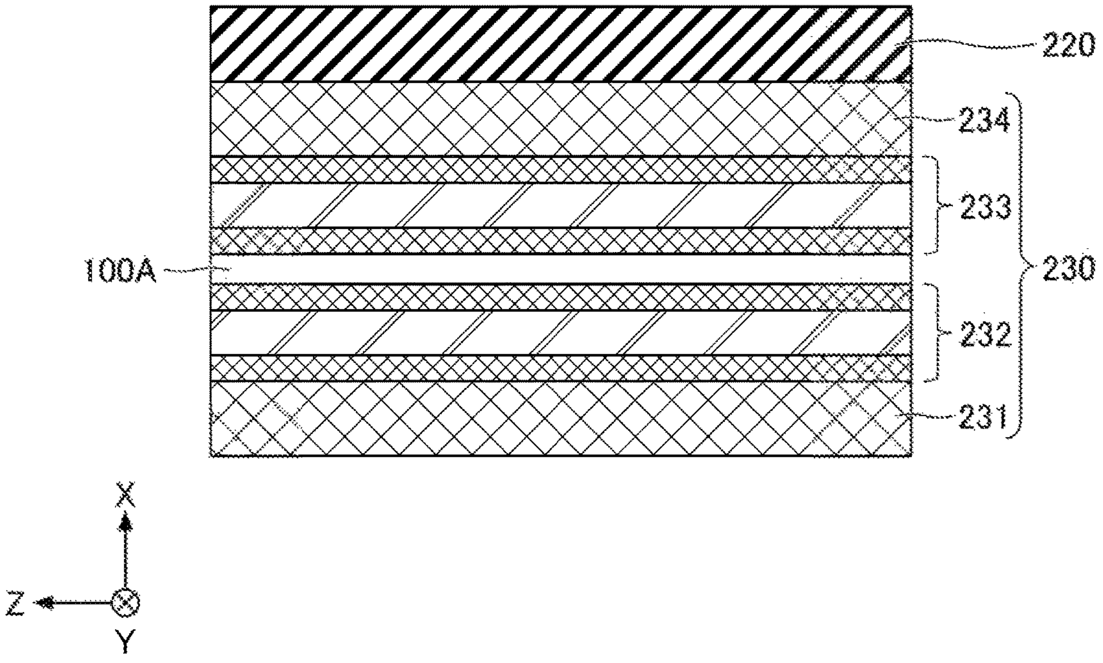
FIG. 3 is an enlarged view of a broken line portion A of FIG. 1.

Next, the positional relationship between the antenna device 100 and the display operation unit 230 is described. FIG. 3 is an enlarged view of the broken line portion A of FIG. 1.

The display operation unit 230 has a display panel 231, a layer 232, a layer 233, and an adhesive layer 234. The adhesive layer 234 is a layer made of an adhesive that is provided for bonding the display operation unit 230 to the transparent cover 220.

The display panel 231 is, for example, a liquid crystal display panel, an organic EL (electroluminescence) display panel, or an OLED (organic light emitting diode) display panel, and is arranged on the lowest side of the display operation unit 230.

The layers 232 and 233 include at least a touch panel, a polarization plate, and a plurality of adhesive layers. The layer 232 may include a touch panel and an adhesive layer, and the layer 233 may include a polarization plate and an adhesive layer. Conversely, the layer 232 may include a polarizing plate and an adhesive layer, and the layer 233 may include a touch panel and an adhesive layer.

In FIG. 3, for example, the portion 100A of the antenna device 100 is illustrated between the layers 232 and 233, but the portion 100A may be disposed between the layer 233 and the adhesive layer 234 or between the layer 232 and the display panel 231.

In the position where the portion 100A of the antenna device 100 is not present, the cross-sectional structure of the transparent cover 220 and the display operation unit 230 is a structure in which the portion 100A of the antenna device 100 is removed from FIG. 3.

Figure 4:
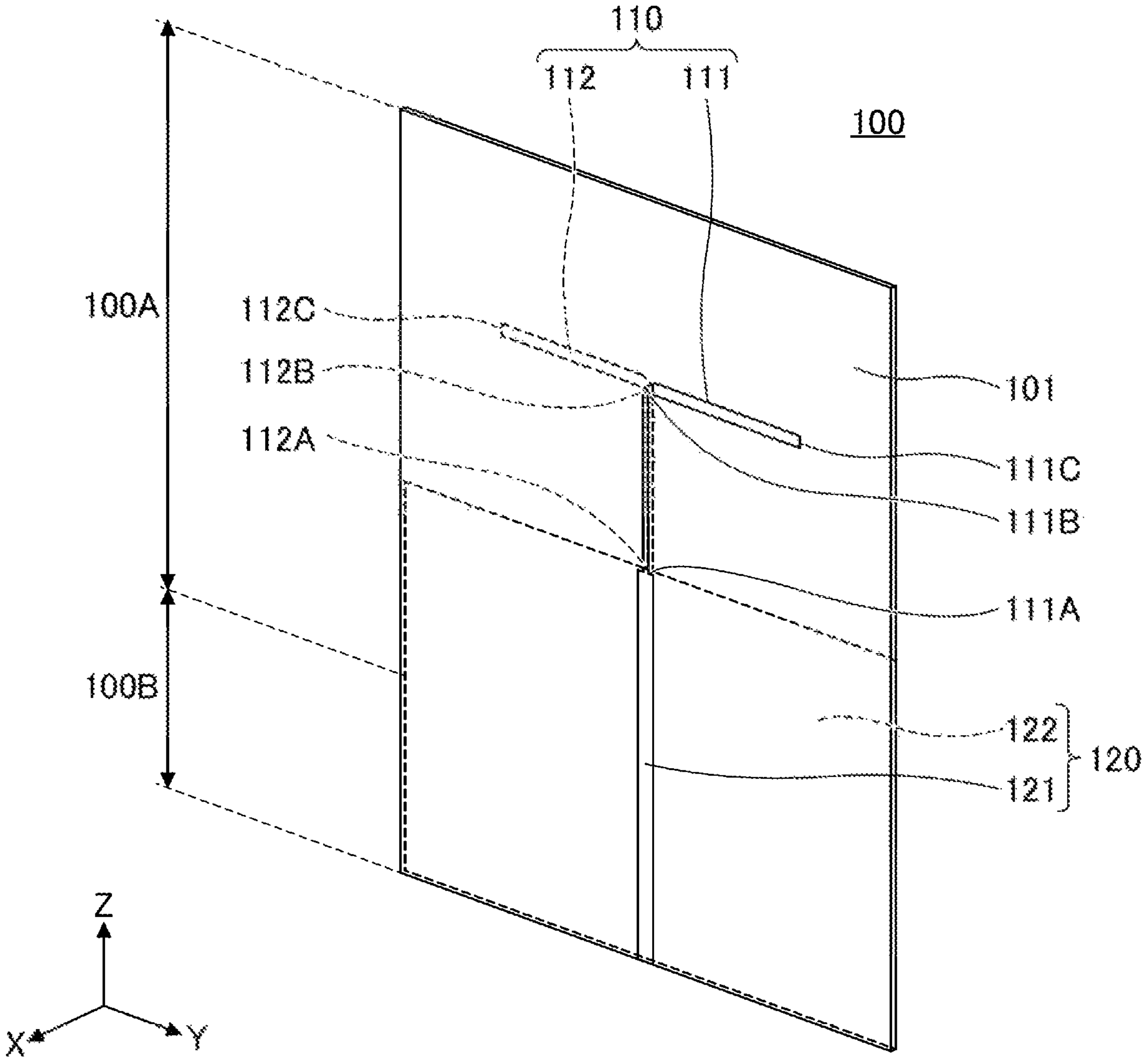
FIG. 4 is a drawing illustrating an antenna device 100.

FIGS. 4 and 5 are drawings illustrating the antenna device 100. FIGS. 4 and 5 illustrate a state before the portion 100B is bent in parallel with the YZ plane as illustrated in FIGS. 1 and 2.

Figure 5B:
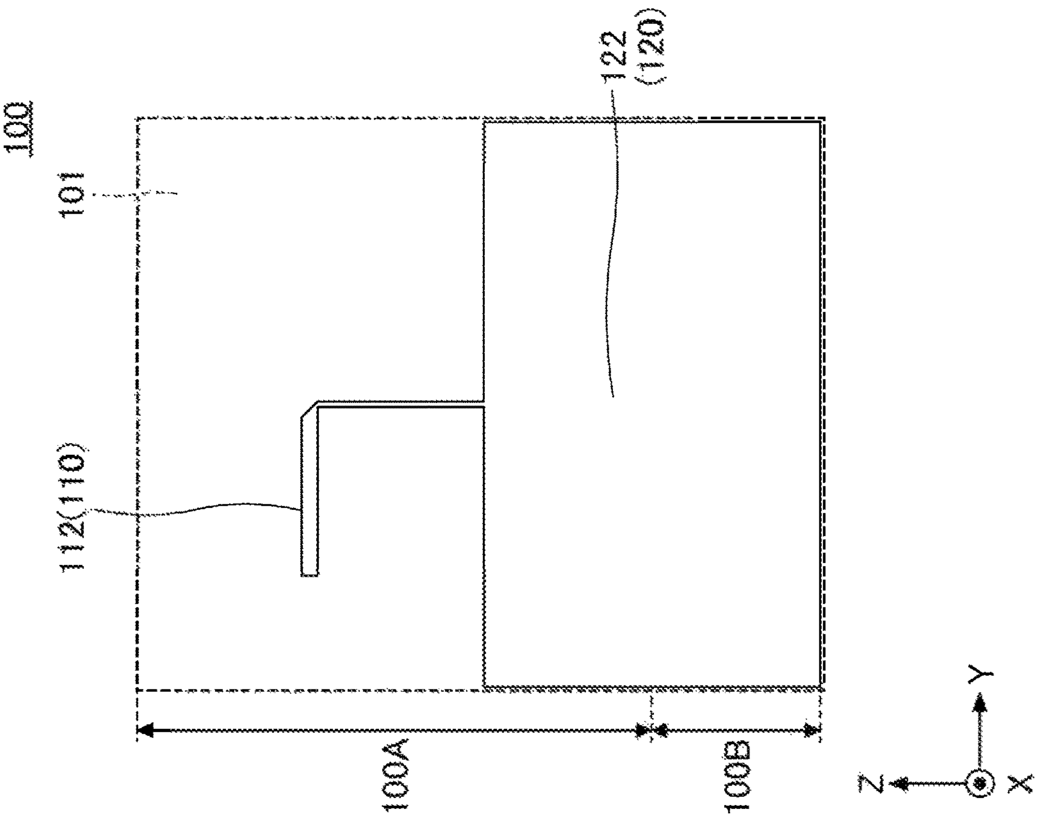
FIGS. 5A and 5B are drawings illustrating the antenna device 100.
Figure 5A:
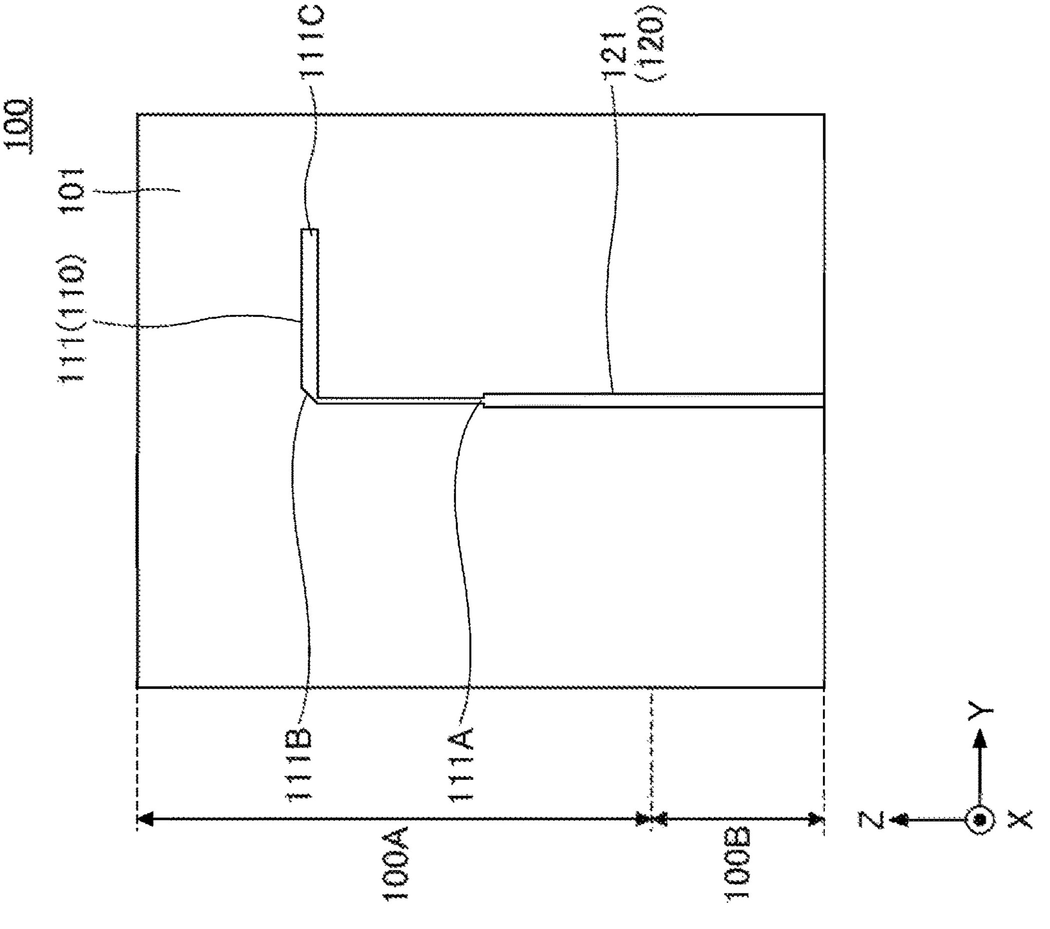

The antenna device 100 includes a substrate 101, an antenna element 110, and a microstrip line 120. FIG. 5A illustrates the substrate 101 and the components provided on the surface of the substrate 101 on the +X direction side, and FIG. 5B illustrates the components provided on the surface of the substrate 101 on the +X direction side. In FIG. 5B, the position of the substrate 101 is indicated by a broken line.

The portion of the microstrip line 120 that is included in the portion 100A is, for example, about ½ to ¾, on the +Z direction side, of the entirety of the microstrip line 120 in the Z direction. Therefore, the portion of the microstrip line 120 that is included in the portion 100B is, for example, about ¼ to ½ of the entirety of the microstrip line 120 in the Z direction.

Specifically, the boundary between the portions 100A and 100B illustrated in FIGS. 1 and 2 is about ½ to ¾ from the end portion, on the +Z direction side, of the microstrip line 120 in the Z direction. Since the portion 100B is situated over the display panel 231 illustrated in FIG. 3, the portion 100B may be transparent to avoid reducing the visibility. The portion 100B does not have to be transparent.

FIGS. 4 and 5 illustrate, for example, a configuration in which the boundary between the portions 100A and 100B is ½ from the end portion, on the +Z direction side, of the microstrip line 120 in the Z direction.

The substrate 101 is, for example, a flexible substrate made of polyimide and can be bent in the Z direction and/or the Y direction. The substrate 101 is colorless and transparent.

The antenna element 110 is a dipole type antenna and has elements 111 and 112. The element 111 is provided on the surface of the substrate 101 on the +X direction side, and is an L-shaped element having a feeding point 111A, a bent portion 111B, and an open end 111C. The element 111 extends from the feeding point 111A toward the bent portion 111B in the +Z direction, is bent in the +Y direction at the bent portion 111B, and extends to the open end 111C.

The element 112 is an L-shaped element provided on the surface of the substrate 101 on the −X direction side, and includes a feeding point 112A, a bent portion 112B, and an open end 112C. The section between the feeding point 112A and the bent portion 112B is superposed in a plan view on the section between the feeding point 112A and the bent portion 112B of the element 111, and the section between the bent portion 112B and the open end 112C extends in the −Y direction in a direction opposite to the section between the bent portion 111B and the open end 111C of the element 111. The length in the Y direction between the open end 111C and the open end 112C is set to be about ½ of the electric length λe of the wavelength λ (i.e., λe/2) at the resonance frequency of the antenna device 100.

The microstrip line 120 is a feeding line including a transmission line 121 and a ground layer 122. The transmission line 121 is provided on the surface of the substrate 101 on the +X direction side, and is connected to the feeding point 111A of the element 111.

The ground layer 122 is provided to be stacked on the transmission line 121 in a plan view on the surface of the substrate 101 on the −X direction side. An edge of the ground layer 122 on the +Z direction side is connected to the feeding point 112A of the element 112.

In the antenna device 100 having such a configuration, the section in the Z direction where the antenna element 110 and the portion of the microstrip line 120 on the +Z direction side is provided is the portion 100A illustrated in FIGS. 1 and 2. A section of the antenna device 100 in the Z direction where the remaining portion of the microstrip line 120 is provided is the portion 100B illustrated in FIGS. 1 and 2.

Since the antenna device 100 is bent between the portions 100A and 100B illustrated in FIGS. 1 and 2, the substrate 101 of the antenna device 100 is bent at a position between the end of the antenna element 110 and an end portion of the ground layer 122 on a side away from the antenna element 110.

Figure 6:
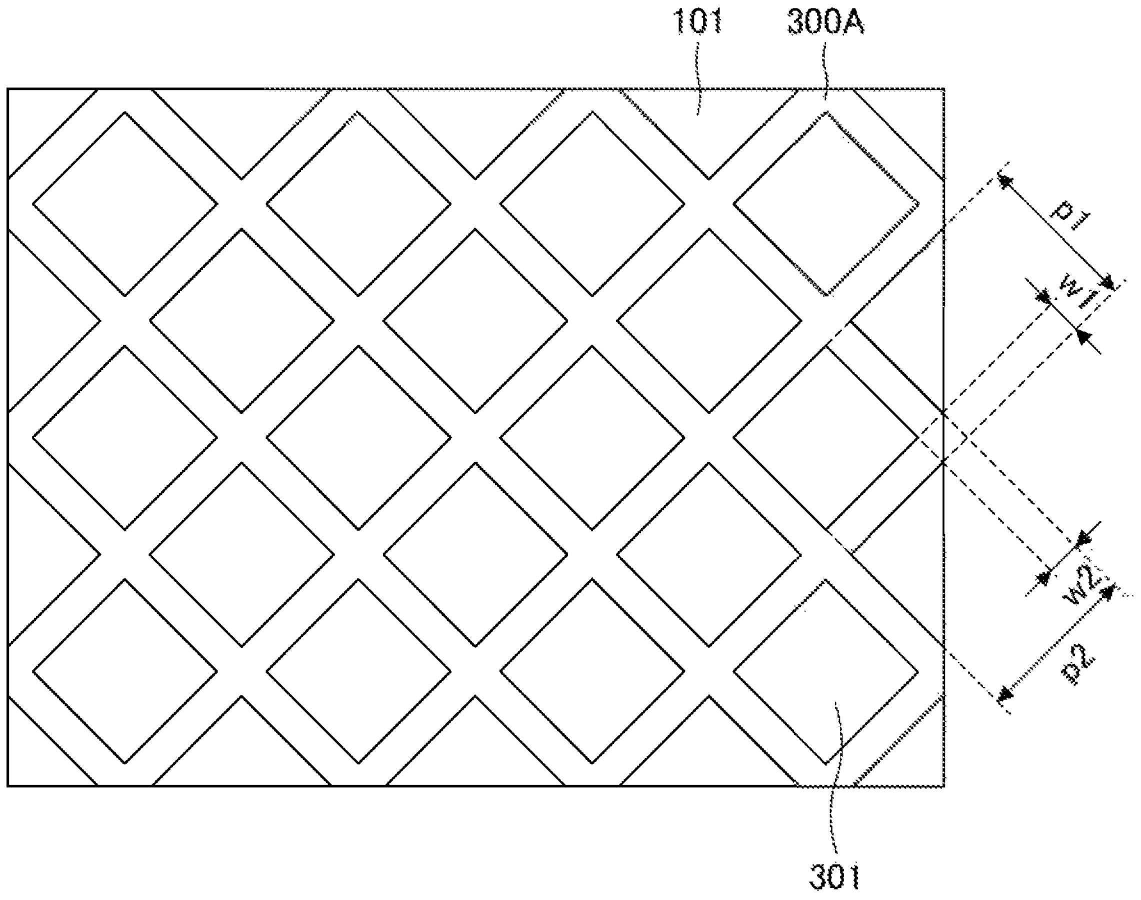
FIG. 6 is a drawing illustrating a transparent conductor 300A.

FIG. 6 is a drawing illustrating the transparent conductor 300A. The transparent conductor 300A is formed on the surface of the transparent substrate 101, and is used, for example, as the antenna element 110 and the microstrip line 120 included in the portion 100A illustrated in FIGS. 4 and 5. The transparent conductor 300A is a conductor having such a high light transmittance that it is difficult to see the transparent conductor 300A with human visual acuity.

The transparent conductor 300A is, for example, a conductive line in a mesh form in order to increase light transmittance. In this case, "mesh" means a state in which through holes 301 in a form of mesh are formed in the transparent conductor 300A.

In a case where the transparent conductor 300A is formed in a mesh form, the openings of the mesh may be in a rectangular or rhomboid shape. When the openings of the mesh are formed in a rectangular shape, the openings of the mesh are preferably in a square shape. When the openings of the mesh are in a square shape, the design is good. Alternatively, the openings of the mesh may be in self assembly-based random shapes. Such random shapes can prevent moiré. The line widths w1, w2 of the mesh are preferably 1 to 10 μm. Furthermore, the line gaps p1, p2 of the mesh are preferably 300 to 500 μm.

The aperture ratio of the transparent conductor 300A is preferably 80% or more and more preferably 90% or more. The aperture ratio is a ratio of an area of aperture portions to a certain area of the transparent conductor 300A including the aperture portions (the through holes 301). The visible light transmittance of the transparent conductor 300A can be increased in accordance with an increase in the aperture ratio of the transparent conductor 300A.

In order to increase the visible light transmittance, the thickness of the transparent conductor 300A is preferably 400 nm or less and more preferably 300 nm or less. The lower limit of the thickness of the transparent conductor 300A is not particularly limited, but may be 2 nm or more, may be 10 nm or more, or may be 30 nm or more in order to improve the radiation characteristics.

In a case where the transparent conductor 300A is formed in a mesh form, the thickness of the transparent conductor 300A may be 1 to 40 μm. In a case where the transparent conductor 300A is formed in a mesh form, the visible light transmittance can be increased even when the transparent conductor 300A is thick. The thickness of the transparent conductor 300A is more preferably 5 μm or more and still more preferably 8 μm or more. The thickness of the transparent conductor 300A is more preferably 30 μm or less, still more preferably 20 μm or less, and particularly more preferably 15 μm or less.

The conductive material of the transparent conductor 300A may be copper, but other materials such as gold, silver, platinum, aluminum, and chromium may be used, and the conductive material is not limited to these materials.

Since the portion 100A of the antenna device 100 is situated over the display panel 231 (see FIG. 3), the conductors (such as the antenna element 110 and the microstrip line 120) included in the portion 100A may be implemented by the transparent conductor 300A, for example.

The antenna element 110 implemented by the transparent conductor 300A and a portion of the microstrip line 120 are an antenna element and a feeding line, respectively, that are transparent and have such a high light transmittance that it is difficult to see the antenna element 110 and the microstrip line 120 with human visual acuity.

Further, since the remaining portion of the microstrip line 120 included in the portion 100B of the antenna device 100 is located on the rear side of the display panel 231 (see FIG. 3), the remaining portion does not have to be transparent, and may be a solid pattern of copper and the like.

Figure 7A:
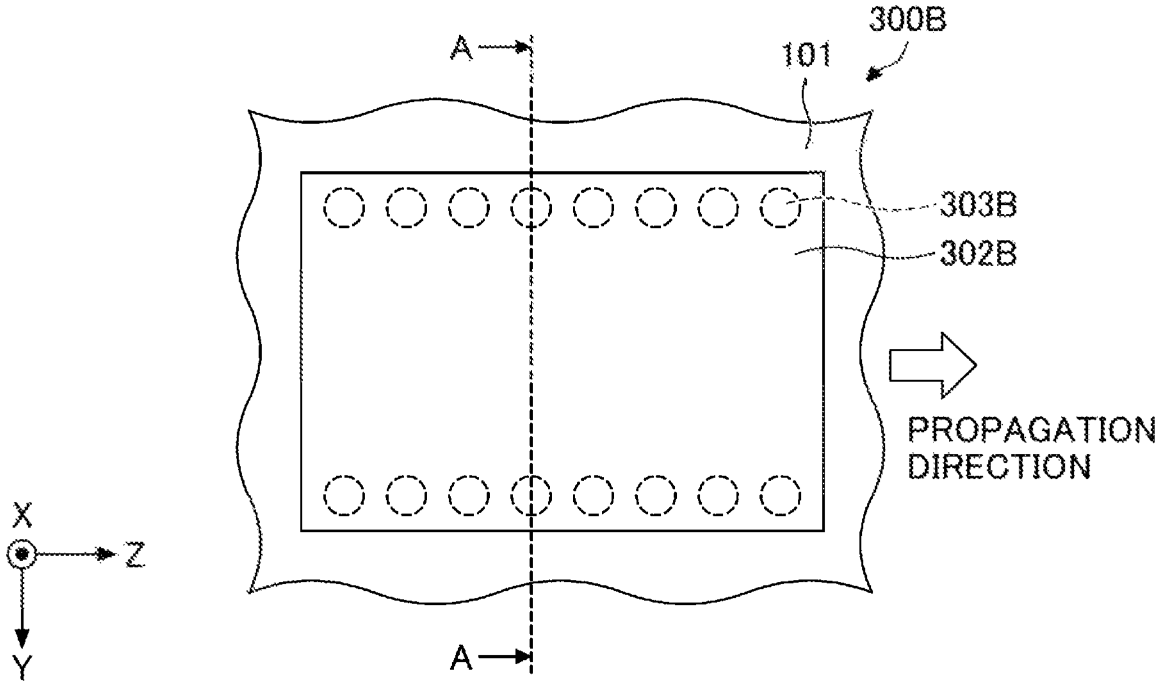
FIGS. 7A and 7B are drawings illustrating a waveguide 300B formed in a substrate 101.
Figure 7B:
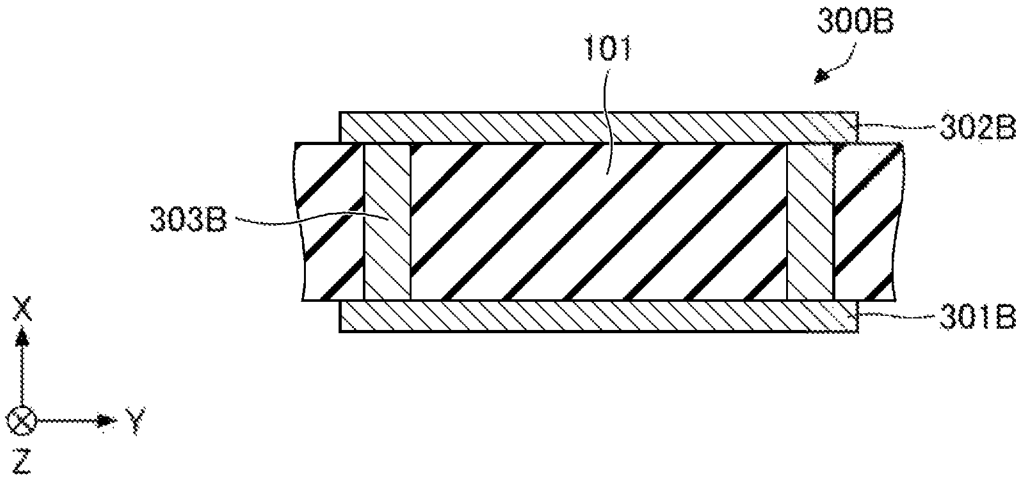

The remaining portion of the microstrip line 120 included in the portion 100B may be made of a waveguide 300B as illustrated in FIGS. 7A and 7B. FIGS. 7A and 7B are drawings illustrating the waveguide 300B formed on the substrate 101. FIG. 7A illustrates the waveguide 300B in a plan view, and FIG. 7B illustrates a cross section taken along arrow A-A of FIG. 7A. In FIGS. 7A and 7B, an XYZ coordinate system is defined as illustrated for example.

The waveguide 300B is formed in the substrate 101 and includes conductive layers 301B and 302B and through holes (THs) 303B. The waveguide 300B is what is termed as a SIW (Substrate Integrated Waveguide) including: the conductive layers 301B and 302B provided on both surfaces of the single-layer substrate 101; and the THs 303B.

The conductive layers 301B and 302B are solid patterns (solid patterns) formed in a portion of the area between the surface on the −X direction side and the surface on the +X direction side of the substrate 101. The conductive layers 301B and 302B are provided on both surfaces of the substrate 101 with the same size in a plan view and aligned with each other.

The TH 303B is a conductor in a column or tube shape that is formed inside the through hole penetrating the substrate 101 in the X direction by plating or the like. The THs 303B connect the conductive layers 301B and 302B. The THs 303B are provided at equal intervals on both sides of the conductive layers 301B and 302B along the propagation direction of the electromagnetic waves (in this case, for example, +Z direction). The gap between the adjacent THs 303B in the Z direction is set to be less than the wavelength of the propagating electromagnetic waves. Thus, the space surrounded by the conductive layers 301B and 302B and the THs 303B can be shielded.

The space surrounded by the conductive layers 301B and 302B and the THs 303B is a shielded transmission line, which can trap electromagnetic waves and allow the electromagnetic waves to propagate in the Z direction. The waveguide 300B described above may be used as a feeding line in the portion 100B (see FIGS. 1 and 2) of the antenna device 100 instead of the remaining portion of the microstrip line 120.

Figure 8:
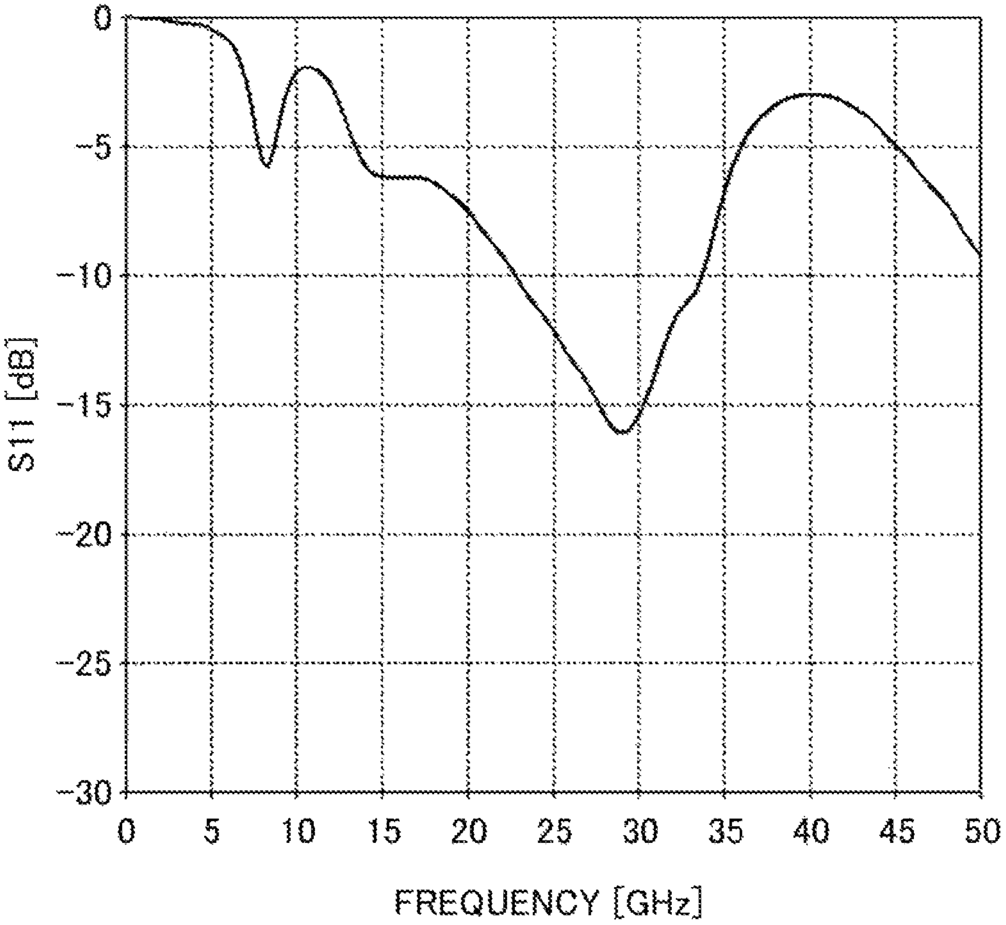
FIG. 8 is a diagram illustrating frequency characteristics of the S11 parameter of the antenna device 100.

FIG. 8 is a diagram illustrating frequency characteristics of the S11 parameter of the antenna device 100. FIG. 8 illustrates frequency characteristics of the S11 parameter obtained by an electromagnetic field simulation performed by setting the resonance frequency of the antenna device 100 to 28 GHz. Good characteristics were obtained in which the S11 parameter was not greater than −5 dB over a wide range around 28 GHz.

Figure 9:
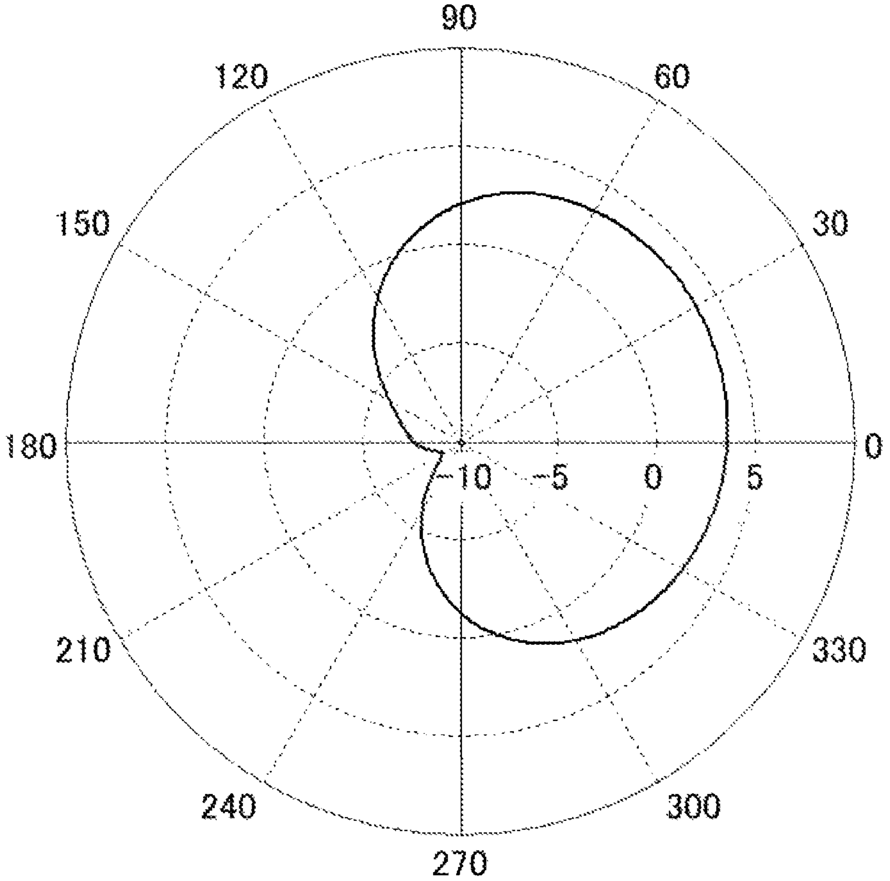
FIG. 9 illustrates a directivity derived by an electromagnetic simulation that is performed when the resonant frequency of the antenna device 100 is set to 28 GHz.

FIG. 9 illustrates the directivity obtained by an electromagnetic field simulation performed by setting the resonance frequency of the antenna device 100 to 28 GHz. The directivity illustrated in FIG. 9 is the directivity of the main lobe of the antenna device 100. The direction of 0 degrees corresponds to the +Z direction, and the direction of 90 degrees corresponds to the +X direction. As illustrated in FIG. 9, it can be understood that the directivity in the +Z direction (the direction of 0 degrees) was obtained.

Figure 10:
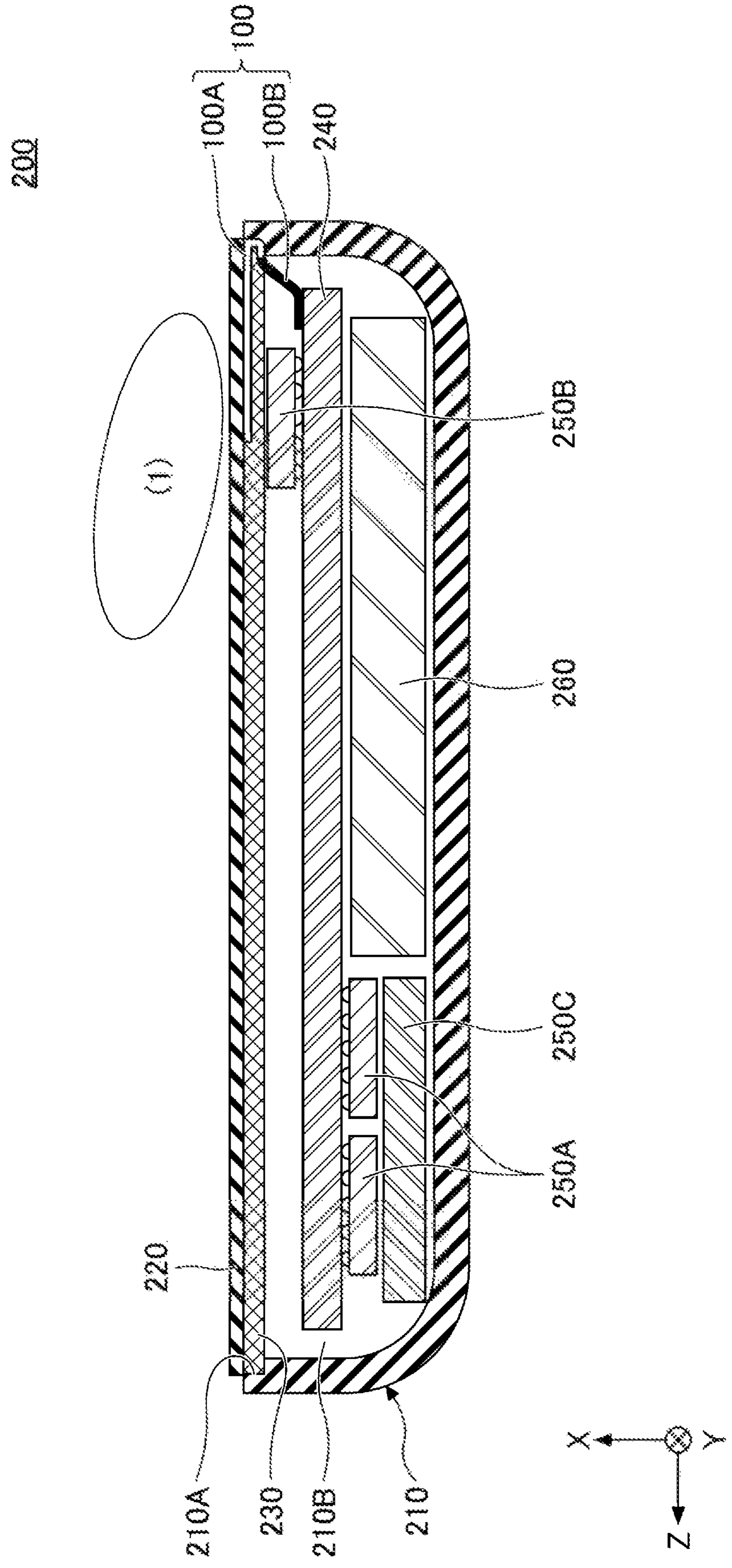
FIG. 10 is a drawing in which the directivity of the antenna device 100 is indicated in an exemplary cross-section of the electronic apparatus 200.

FIG. 10 is a diagram illustrating the directivity of the antenna device 100 in an example of a cross section of the electronic apparatus 200. The directivity illustrated in FIG. 9 indicates that electromagnetic waves can be radiated in the direction indicated by (1) in FIG. 10 and electromagnetic waves in the direction indicated by (1) can be received. The direction indicated by (1) is a direction in which radiation is emitted from the surface of the transparent cover 220 of the electronic apparatus 200 (the surface of the electronic apparatus 200) along the surface of the transparent cover 220. Since the antenna device 100 has the directivity oriented in the direction (1), the antenna device 100 can communicate with a communication device external to the electronic apparatus 200.

As described above, the antenna device 100 has a configuration in which the transparent antenna element 110 is provided on the transparent substrate 101. The transparent antenna element 110 is provided at a position visible from the outside of the transparent cover 220, and is stacked on the display panel 231 (see FIG. 3).

Thus, the antenna device 100 can be provided that includes the transparent antenna element 110 that can be provided at a position visible from the outside of the transparent cover 220 of the electronic apparatus 200, the transparent portion of the microstrip line 120 that is included in the portion 100A, and the transparent substrate 101.

Furthermore, the antenna element 110 of the dipole type and the microstrip line 120 can be formed very thin. For example, when the allowable thickness of the antenna device 100 is greatly limited, e.g., 100 μm or less, it is difficult to use an antenna device such as a patch antenna which requires a certain thickness for the ground layer. In this regard, the antenna device 100 including the dipole antenna element 110 and the microstrip line 120, which can be formed very thin, is very advantageous from the viewpoint of reduction in the thickness.

Although the transparent cover 220 of the electronic apparatus 200 is in the form of a flat plate, the transparent cover 220 may be curved.

Although the configuration in which the antenna element 110 is a dipole antenna has been described above, the antenna element 110 may be a monopole antenna, a tapered slot antenna, a slot antenna, or a log periodic antenna.

The antenna device 100 may further include one or more parasitic elements that are fed via the antenna element 110. In this case, the directivity toward the outside of the electronic apparatus 200 may be achieved by adjusting the positional relationship between the antenna element 110 and one or more parasitic elements.

Figure 11:
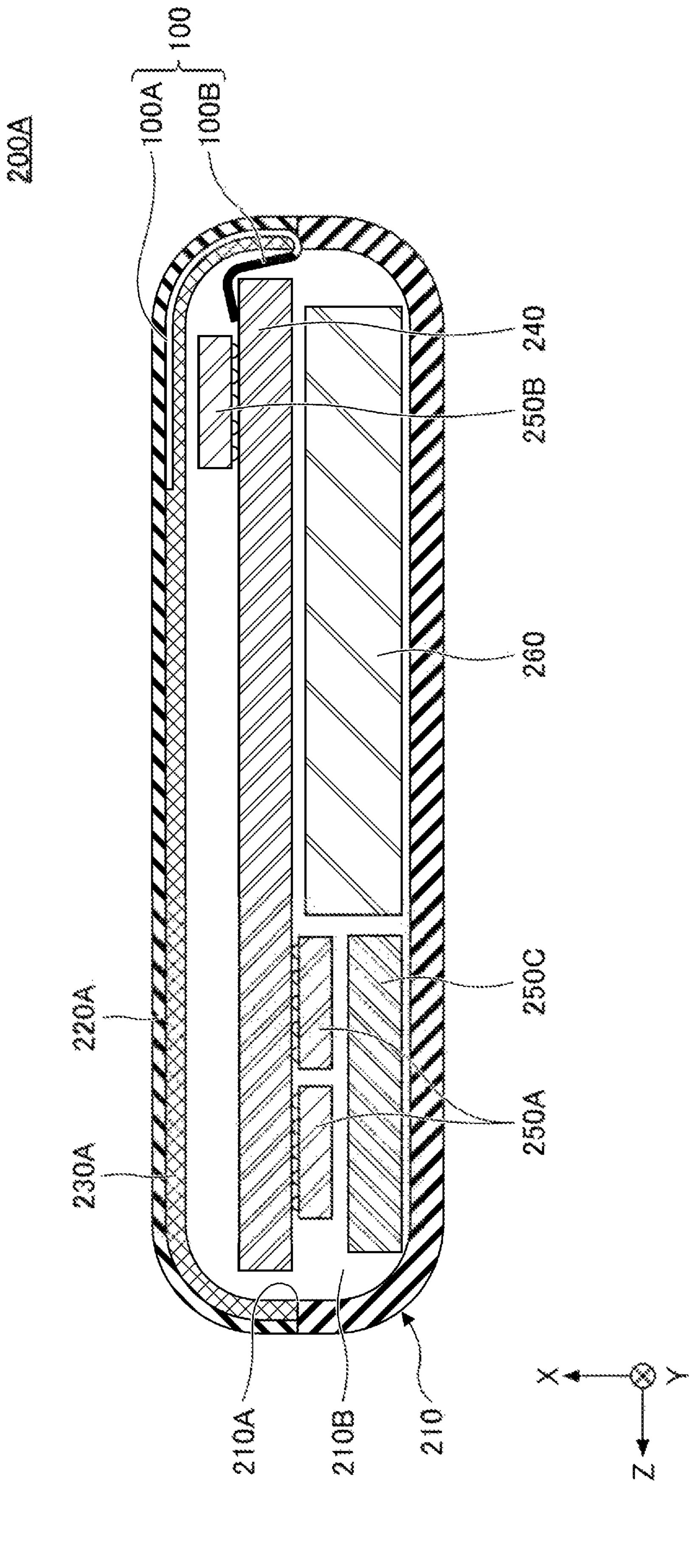
FIG. 11 is a cross sectional view illustrating an electronic apparatus 200A according to a modified embodiment of the embodiment.

FIG. 11 is a cross sectional view illustrating an electronic apparatus 200A according to a modified embodiment of the embodiment. FIG. 11 illustrates a cross section corresponding to FIG. 1. The electronic apparatus 200A includes a transparent cover 220A and a display operation unit 230A having curved end portions in a plan view instead of the flat transparent cover 220 and the display operation unit 230 of the electronic apparatus 200 illustrated in FIG. 1. For the ease of understanding of the positions of the portions 100A and 100B, the portion 100A is illustrated in white with an outline, and the portion 100B is illustrated in gray.

In the XZ sectional view, both ends of the transparent cover 220A in the Z direction are curved in the −X direction.

This is also applicable to the YZ cross section. The display operation unit 230A includes an OLED as a display panel for example, and has a curved shape similar to that of the transparent cover 220A.

In FIG. 11, the portion 100A of the antenna device 100 is provided over the flat upper surface portion and the curved portion of the transparent cover 220A.

In FIG. 11, for the convenience of explanation, the portion 100A, of the antenna device 100 is illustrated between the transparent cover 220A and the display operation unit 230A, but the portion 100A of the antenna device 100 is not limited to be provided between the display operation unit 230A and the transparent cover 220A, but may be disposed between the layers 232 and 233 illustrated in FIG. 3, between the layer 233 and the adhesive layer 234, or between the layer 232 and the display panel 231.

Figure 12:
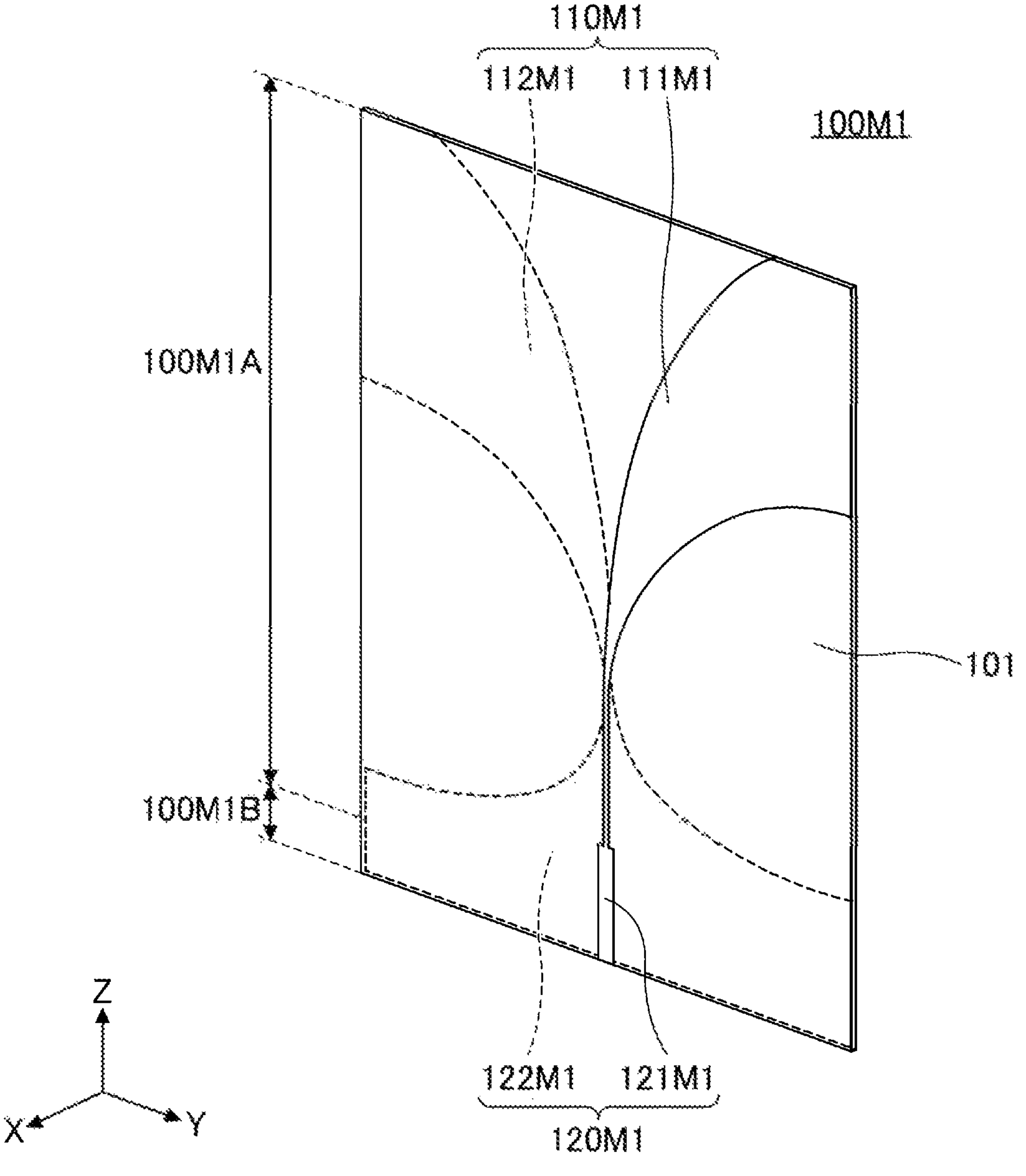
FIG. 12 is a drawing illustrating an antenna device 100M1.

The electronic apparatus 200 or 200A may include an antenna device 100M1 illustrated in FIGS. 12 and 13 instead of the antenna device 100 illustrated in FIGS. 4 and 5. FIGS. 12 and 13 are drawings illustrating the antenna device 100M1.

FIGS. 12 and 13 are drawings illustrating the antenna device 100M1. FIGS. 12 and 13 illustrate the antenna device 100M1 in a state before being bent in parallel with the YZ plane. The antenna device 100M1 includes portions 100M1A and 100M1B. The portions 100M1A and 100M1B are similar to the portions 100A and 100B illustrated in FIGS. 1, 2, 4, and 5. The portion 100M1A is visible from the outside of the electronic apparatus 200 or 200A via the transparent cover 220 or 220A of the electronic apparatus 200 or 200A. The portion 100M1B is situated on the rear side of the display operation unit 230 or 230A and is a portion that is not visible from the outside of the electronic apparatus 200 or 200A.

FIGS. 12 and 13 illustrate, for example, a configuration in which the boundary between the portion 100M1A and the portion 100M1B is ½ from the end portion, on the +Z direction side, of the microstrip line 120M1 in the Z direction.

Figure 13B:
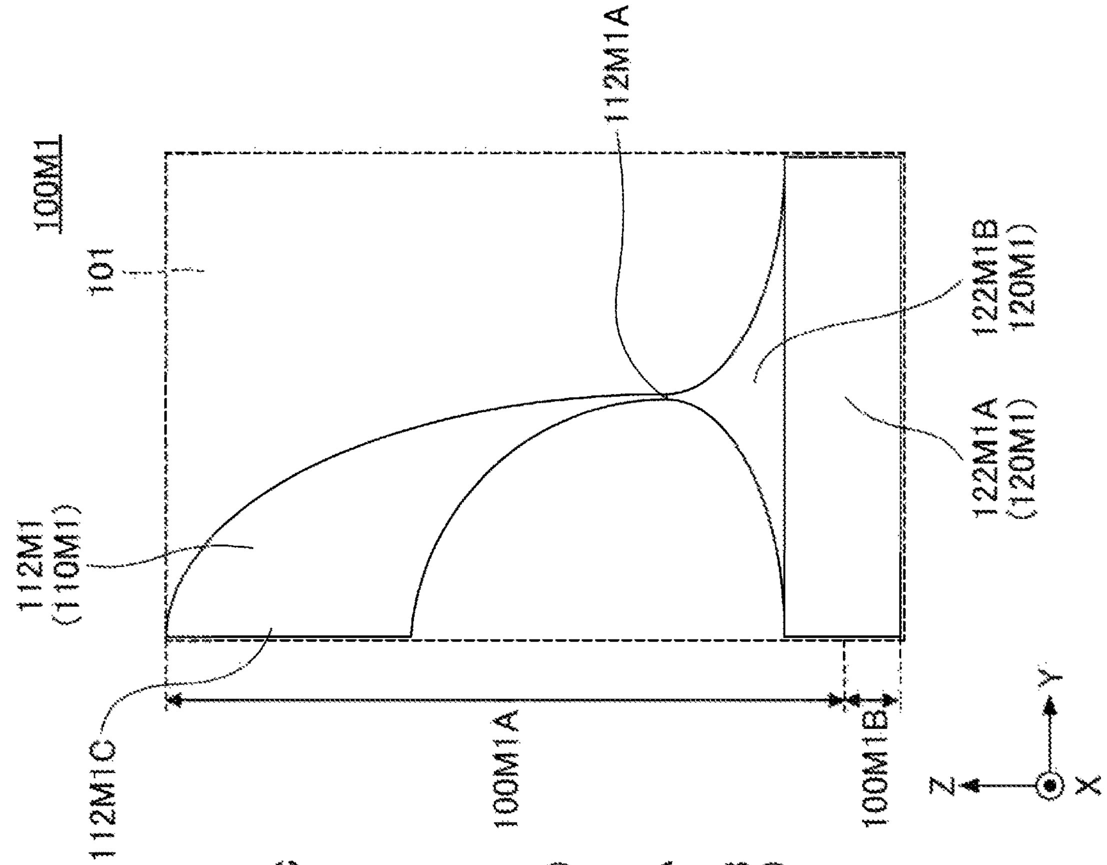
FIGS. 13A and 13B are drawings illustrating an antenna device 100M1.
Figure 13A:
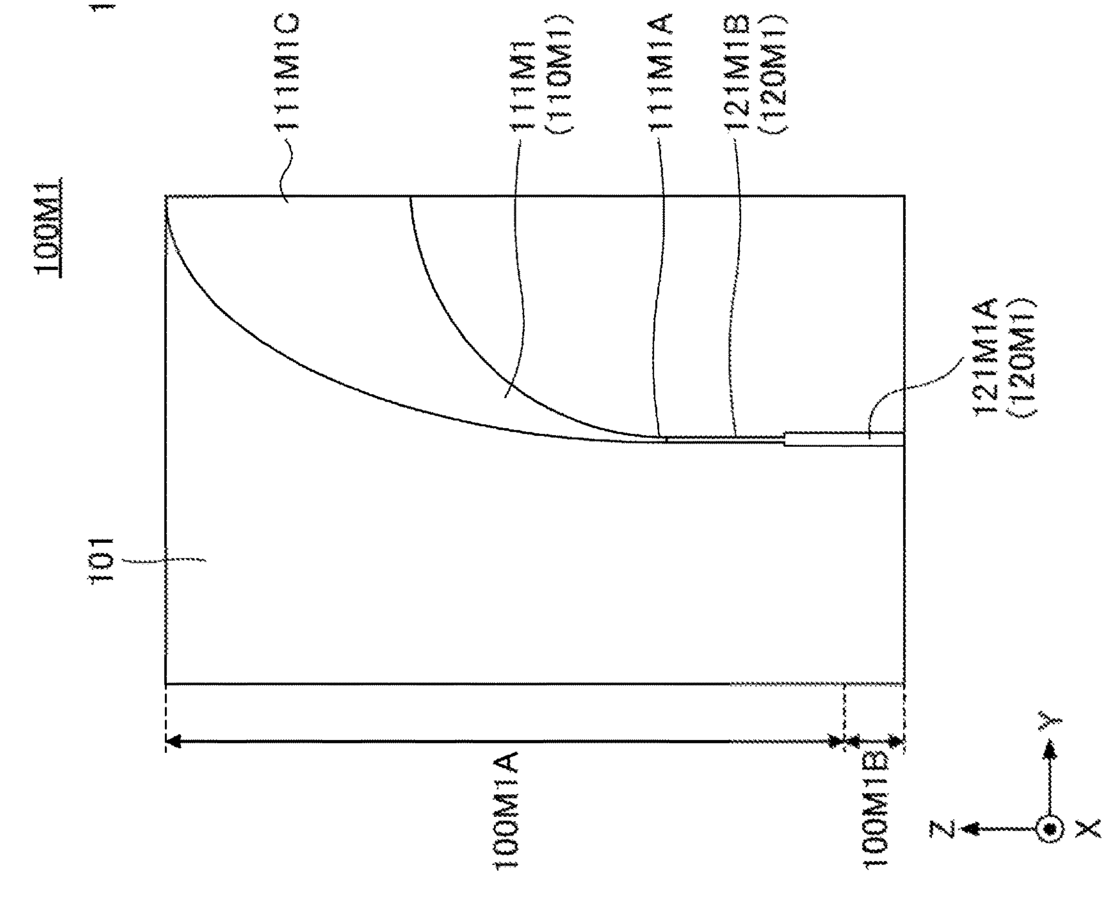

The antenna device 100M1 includes a substrate 101, an antenna element 110M1, and a microstrip line 120M1. FIG. 13A illustrates the substrate 101 and components provided on the surface of the substrate 101 on the +X direction side, and FIG. 13B illustrates components provided on the surface of the substrate 101 on the +X direction side. In FIG. 13B, the position of the substrate 101 is indicated by a broken line.

The antenna element 110M1 is a Vivaldi antenna and has elements 111M1 and 112M1. The antenna element 110 M1 is implemented by a transparent conductor 300A (see FIG. 6).

The element 111M1 is provided on the surface of the substrate 101 on the +X direction side, and includes a feeding point 111M1A and an open end 111M1C. The element 111M1 extends from the feeding point 111M1A to the open end 111M1C.

The element 112M1 is provided on the surface of the substrate 101 on the −X direction side, and includes a feeding point 112M1A and an open end 112M1C. The feeding point 112M1A is superposed on the feeding point 111M1A of the element 111M1 in a plan view. The shape, size, and position of the element 112M1 relative to the substrate 101 as viewed in the −X direction is equal to the shape, size, and position of the element 111M1 relative to the substrate 101 as viewed in the +X direction.

The microstrip line 120M1 has transmission lines 121M1A, 121M1B and ground layers 122M1A, 122M1B. The transmission lines 121M1A and 121M1B are provided on the surface of the substrate 101 on the +X direction side. The transmission line 121M1A is stacked on the ground layer 122M1A. The transmission line 121M1B is connected to the +Z direction side of the transmission line 121M1A, provided to be stacked on the ground layer 122M1B, and connected to the feeding point 111M1A of the element 111M1.

The ground layer 122M1A is a ground pattern in a rectangular shape that is provided on the surface of the substrate 101 on the −X direction side so as to be superposed on the transmission line 121M1A in a plan view. The ground layer 122M1B is continuously formed on the +Z direction side of the ground layer 122M1A, and the width of the ground layer in the Y direction gradually decreases toward the +Z direction side. The end of the ground layer 122M1B in the +Z direction is situated at the center of the substrate 101 in the Y direction, and the width in the Y direction of the end portion of the ground layer 122M1B on the +Z direction side is equal to the width in the Y direction of the feeding point 112M1A of the element 112M1. The end portion of the ground layer 122M1B on the +Z direction side is connected to the feeding point 112M1A of the element 112M1.

In the antenna device 100M1 having such a configuration, a portion in the Z direction where the antenna element 110M1 and a portion of the microstrip line 120M1 on the +Z direction side are provided is the portion 100A illustrated in FIGS. 1 and 2. A section of the antenna device 100M1 where the remaining portion of the microstrip line 120M1 is provided is the portion 100B illustrated in FIGS. 1 and 2. Since the portion 100A is situated over the display panel 231 illustrated in FIG. 3, the portion 100A may be transparent to avoid obstructing the display.

Figure 14:
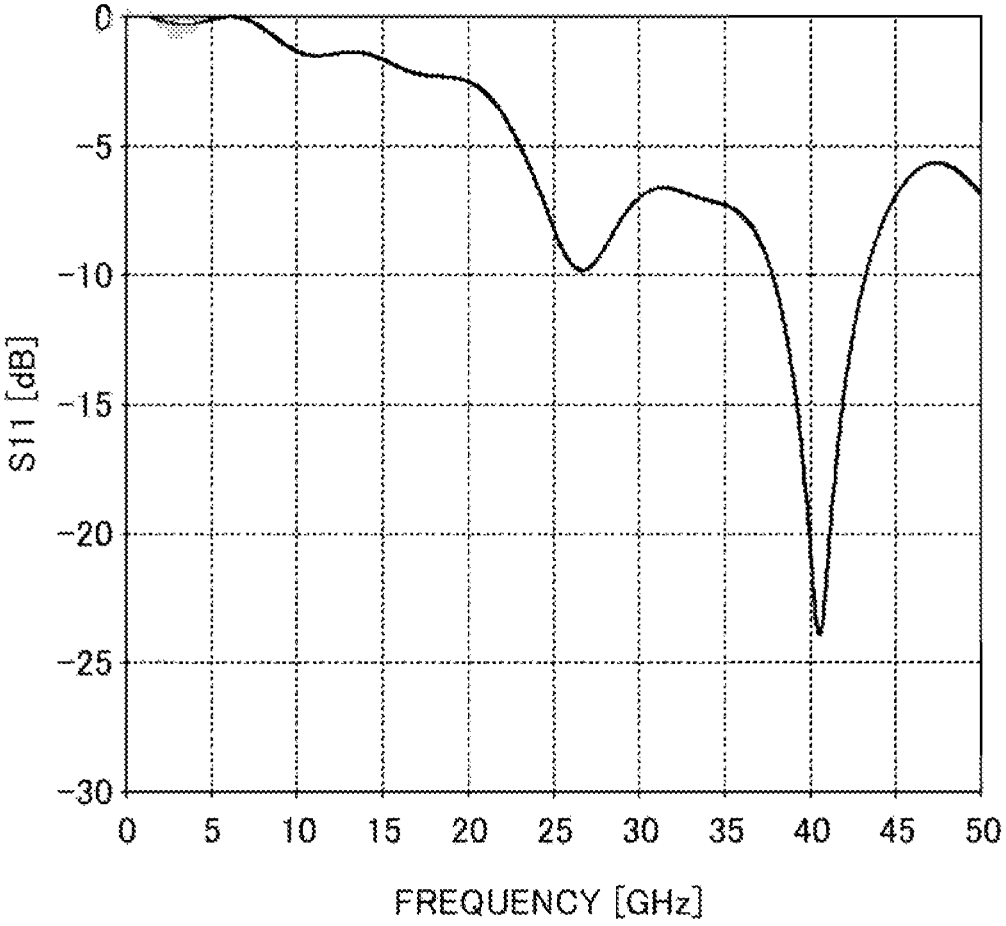
FIG. 14 is a diagram illustrating frequency characteristics of the S11 parameter of the antenna device 100M1.

FIG. 14 is a diagram illustrating frequency characteristics of the S11 parameter of the antenna device 100M1. FIG. 14 illustrates frequency characteristics of the S11 parameter obtained by an electromagnetic field simulation performed by setting the resonance frequency of the antenna device 100M1 to 28 GHz. An adequate bandwidth in which the S11 parameter becomes −5 dB or less was obtained at around 28 GHz. A band in which the S11 parameter is −5 dB or less at about 41 GHz occurred unintentionally.

Figure 15:
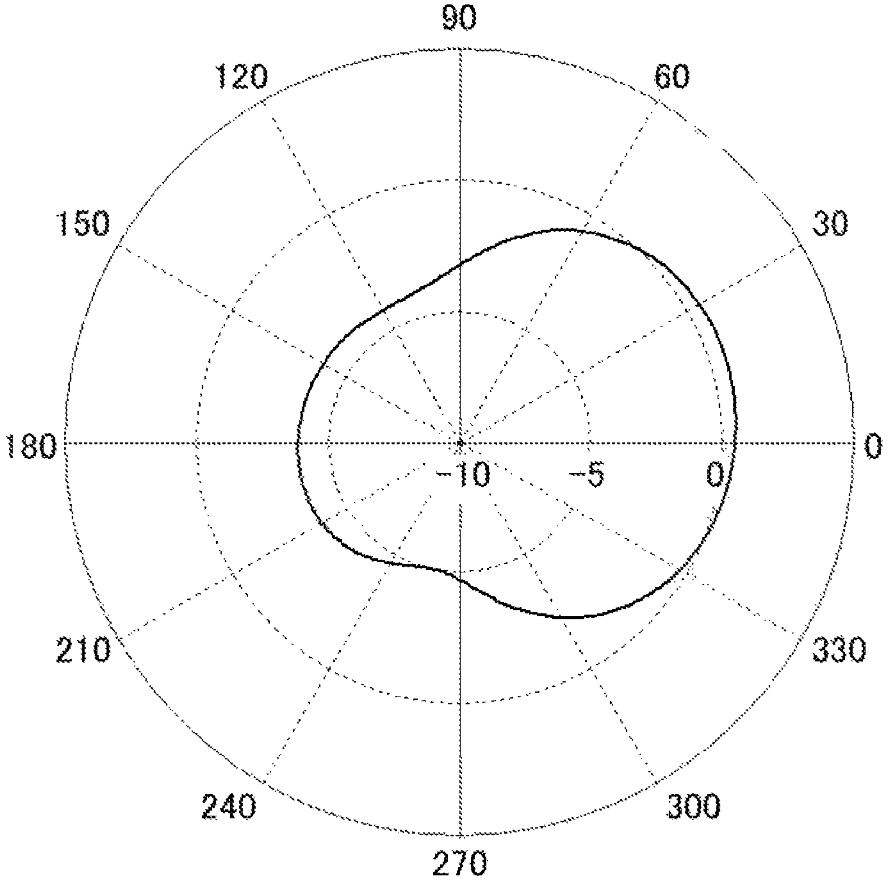
FIG. 15 is a drawing illustrating a directivity derived by an electromagnetic simulation that is performed when the resonant frequency of the antenna device 100M1 is set to 28 GHz.

FIG. 15 is a diagram illustrating the directivity obtained by an electromagnetic field simulation performed by setting the resonance frequency of the antenna device 100M1 to 28 GHz. The directivity illustrated in FIG. 15 is the directivity of the main lobe of the antenna device 100M1. The direction of 0 degrees corresponds to the +Z direction, and the direction of 90 degrees corresponds to the +X direction. As illustrated in FIG. 15, it can be understood that the directivity in the +Z direction (0 degree direction) is obtained.

The directivity when the antenna device 100M1 is attached to the electronic apparatus 200 is considered to be substantially the same as the directivity when the antenna device 100 is attached to the electronic apparatus 200 as illustrated in FIG. 10.

Similar to the antenna device 100, the antenna device 100M1 has a configuration in which the transparent antenna element 110M1 is provided on the transparent substrate 101. The transparent antenna element 110M1 is provided at a position visible from the outside of the transparent cover 220, and is stacked on the display panel 231 (see FIG. 3).

Thus, the antenna device 100M1 can be provided that includes a transparent antenna element 110M1 that can be provided at a position visible from the outside of the transparent cover 220 of the electronic apparatus 200, the transparent portion of the microstrip line 120M1 on the +Z direction side, and the transparent substrate 101.

The antenna element 110M1 of the Vivaldi antenna and the microstrip line 120M1 can be formed very thin. For example, when the allowable thickness of the antenna device 100M1 is greatly limited, e.g., 100 μm or less, it is difficult to use an antenna device such as a patch antenna which requires a certain thickness for the ground layer. In this regard, the antenna device 100M1 including the antenna element 110M1 of the Vivaldi antenna and the microstrip line 120M1, which can be formed very thin, is very advantageous from the viewpoint of reduction in the thickness.

Figure 16:
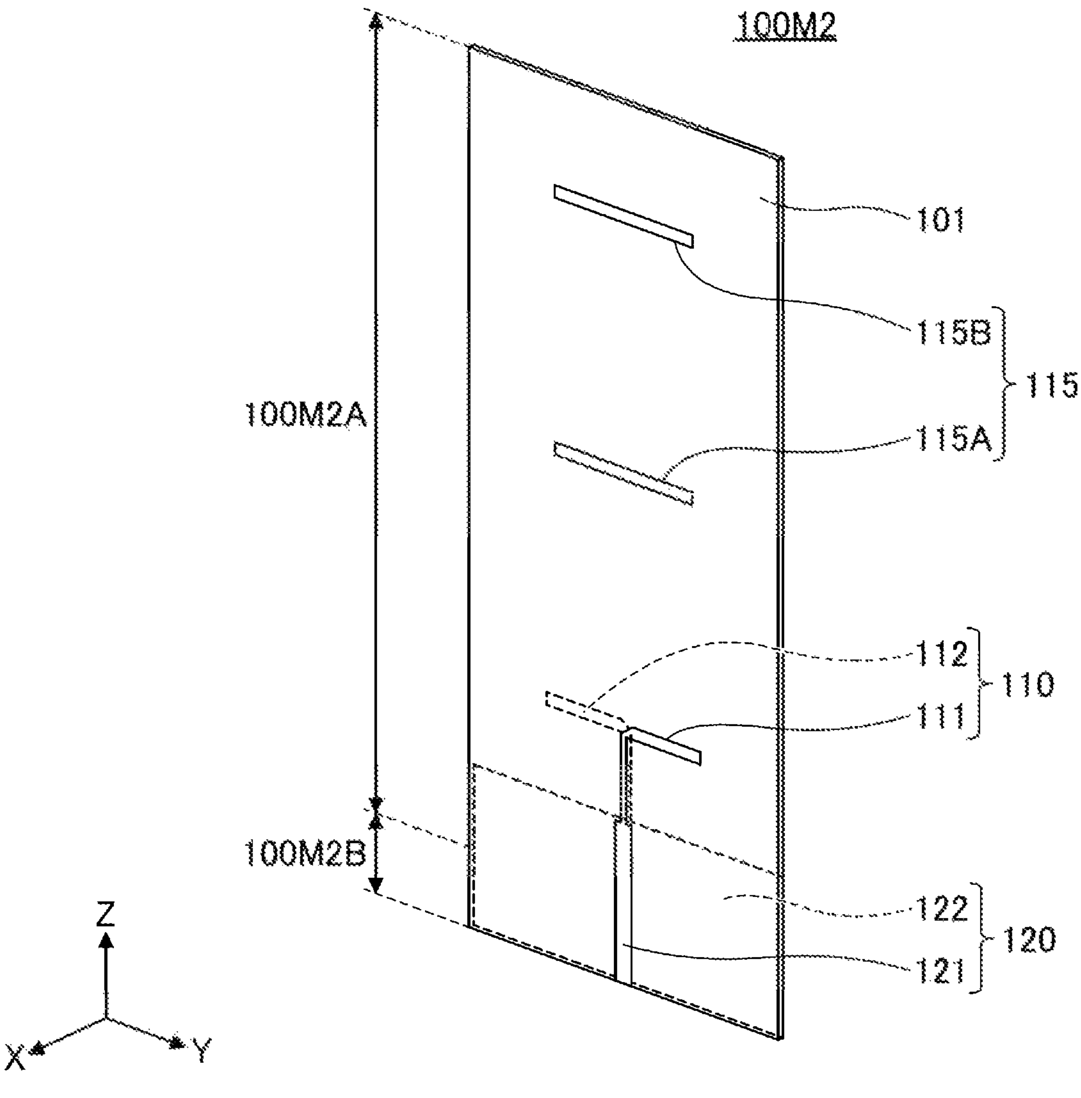
FIG. 16 is a drawing illustrating an antenna device 100M2.

FIGS. 16 and 17 are drawings illustrating the antenna device 100M2. FIGS. 16 and 17 illustrate the antenna device 100M2 in a state before being bent in parallel with the YZ plane. The antenna device 100M2 includes portions 100M2A and 100M2B. The portions 100M2A and 100M2B are similar to the portions 100A and 100B illustrated in FIGS. 1, 2, 4, and 5. The portion 100M2A is visible from the outside of the electronic apparatus 200 or 200A through the transparent cover 220 or 220A of the electronic apparatus 200 or 200A. The portion 100M2B is a portion that is situated on the rear side of the display operation unit 230 or 230A and that is not visible from the outside of the electronic apparatus 200 or 200A.

FIGS. 16 and 17 illustrate, for example, a configuration in which the boundary between the portion 100M2A and the portion 100M2B is ½ from the end portion, on the +Z direction side, of the microstrip line 120 in the Z direction.

The antenna device 100M2 includes a substrate 101, an antenna element 110, directors 115, and a microstrip line 120. The antenna device 100M2 is a Yagi-Uda antenna in which the directors 115 is added to the antenna device 100 illustrated in FIGS. 4 and 5.

Similar to the antenna element 110, the directors 115 are implemented by the transparent conductor 300A (see FIG. 6). The length in the Z direction of the microstrip line 120 having the transmission line 121 and the ground layer 122 is shorter than the length in the Z direction of the microstrip line 120 of the antenna device 100 illustrated in FIGS. 4 and 5, but the configuration thereof is substantially the same.

Figure 17B:
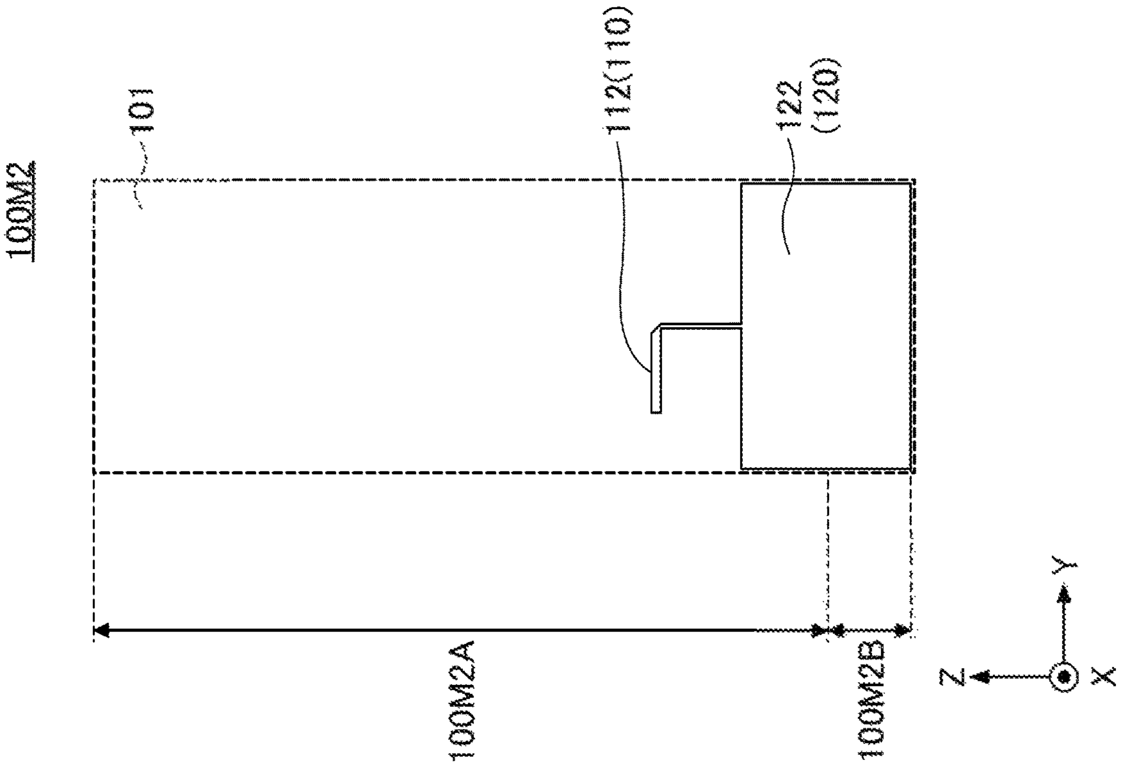
FIGS. 17A and 17B are drawings illustrating the antenna device 100M2.
Figure 17A:
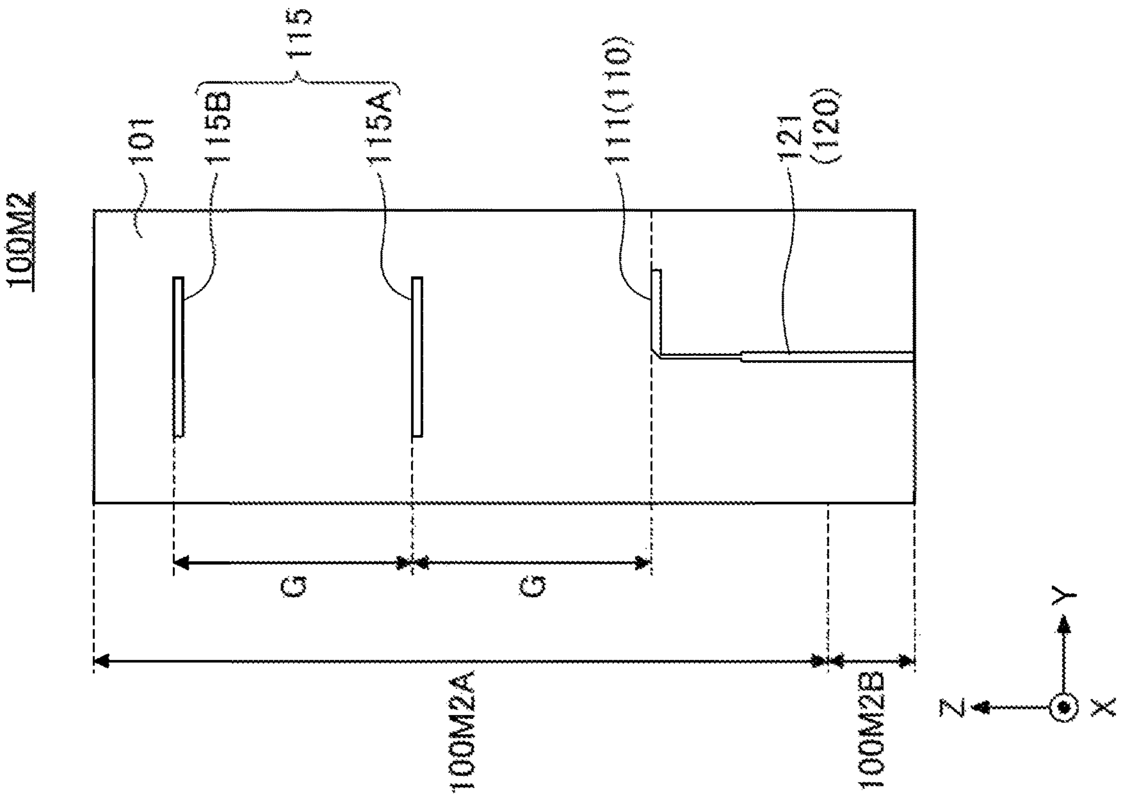

FIG. 17A illustrates the substrate 101 and components provided on the surface of the substrate 101 on the +X direction side, and FIG. 17B illustrates components provided on the surface of the substrate 101 on the +X direction side. In FIG. 17B, the position of the substrate 101 is indicated by a broken line.

The directors 115 include two directors 115A, 115B. Hereinafter, when the two directors 115A and 115B are not distinguished from each other, the directors 115A and 115B are simply referred to as the directors 115. Although FIGS. 16 and 17 illustrate a configuration in which the directors 115 include two directors 115A and 115B, the number of directors 115 may be 1, or may be 3 or more.

The length of the directors 115A, 115B in the Y direction is slightly shorter than the length between the open end 111C and the open end 112C of the antenna element 110. A gap G between the director 115A and the director 115B in the Z direction is equal to a gap G in the Z direction between: the section between the open ends 111C and 112C of the antenna element 110; and the director 115A.

In the antenna device 100M2 having such a configuration, a portion in the Z direction where the antenna element 110, the directors 115, and a portion of the microstrip line 120 on the +Z direction side are provided is the portion 100A illustrated in FIGS. 1 and 2. A portion of the antenna device 100M2 where the remaining portion of the microstrip line 120 is provided is the portion 100B illustrated in FIGS. 1 and 2. Since the portion 100A is situated over the display panel 231 illustrated in FIG. 3, the portion 100A may be transparent to avoid obstructing the display.

Figure 18A:
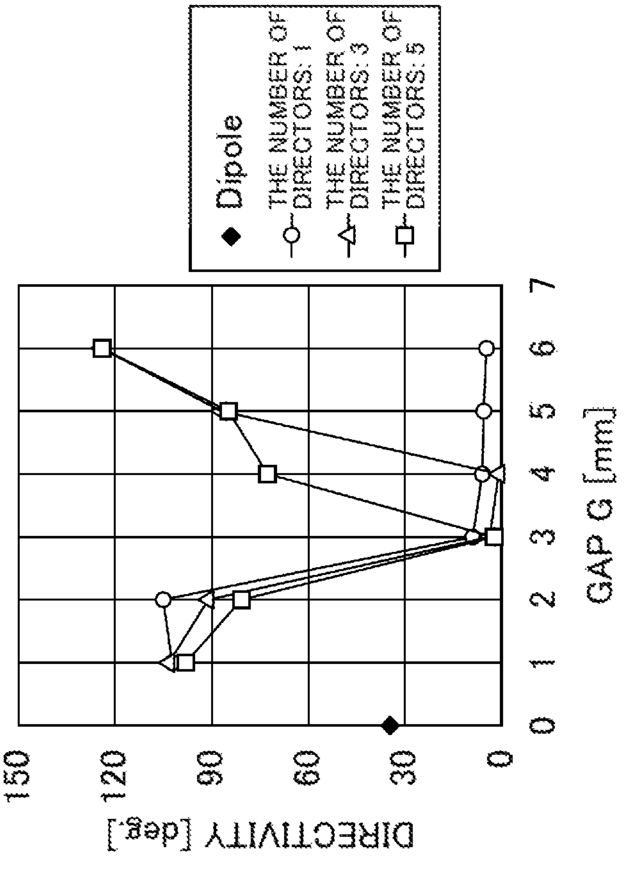
FIGS. 18A and 18B are drawings illustrating between the number of directors 115, gap G, directivity, and gain.
Figure 18B:
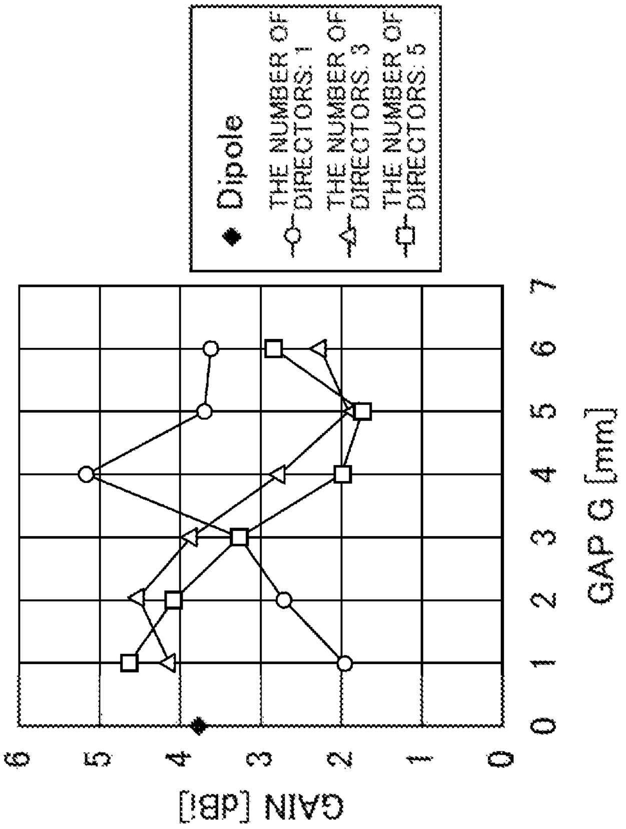

FIGS. 18A and 18B are drawings illustrating between the relationship between the number of directors 115, the gap G, the directivity, and the gain. FIG. 18A illustrates characteristics of directivity with respect to the gap G. FIG. 18B illustrates the characteristics of the gain with respect to the gap G. The number of directors 115 is 0, 1, 3, or 5. When the number of directors 115 is 0, the antenna element 110 is a dipole antenna, and when the number of directors 115 is 1, 3 or 5, the antenna element 110 is a Yagi-Uda antenna. The directivity represents an angle (deg.) of the main lobe, and the gain represents a gain (dBi) of the main lobe.

As illustrated in FIG. 18A, when the gap G is 1 mm and 2 mm, a directivity of about 90 degrees was obtained in any of the cases where the number of directors 115 is 1, 3, and 5. This means that the directivity in the +X direction was obtained in FIGS. 16 and 17.

In the case where the number of the directors 115 was 1, when the gap G was set to 3 mm or more, a directivity of about 10 degrees was obtained. In the case where the number of the directors 115 was 3, when the gap G was set to 3 mm and 4 mm, a directivity of about 10 degrees was obtained, and when the gap was set to 5 mm or more, a directivity of about 90 degrees or more was obtained. In the case where the number of the directors 115 was 5, when the gap G was set to 3 mm, a directivity of about 10 degrees was obtained, and when the gap G was set to 4 mm or more, a directivity of about 75 degrees or more was obtained.

Since the directivity of the dipole antenna is about 35 degrees, it was found that the directivity can be adjusted by selecting the gap G and the number of directors 115.

Further, as illustrated in FIG. 18B, such characteristics were obtained that: in the case where the number of the directors 115 was one, when the gap G was increased from 1 mm to 4 mm, the gain increases from about 2 dBi to about 5 dBi, and when the gap G was set to 5 mm or more, the gain decreases to about 3.5 dBi.

Furthermore, such characteristics were obtained that: in the case where the number of the directors 115 was 3 and 5, when the gap G was 1 mm and 2 mm, a gain of about 4.5 dBi was obtained, and when the gap G was increased from 3 mm or more to 5 mm, the gain gradually decreased to about 2 dBi, and when the gap G becomes 6 mm, the gain slightly increases again.

Regardless of the number of directors 115, it can be confirmed that a gain that is equal to or greater than the gain of the dipole antenna (about 3.7 dBi) can be obtained by selecting the gap G.

Figure 19:
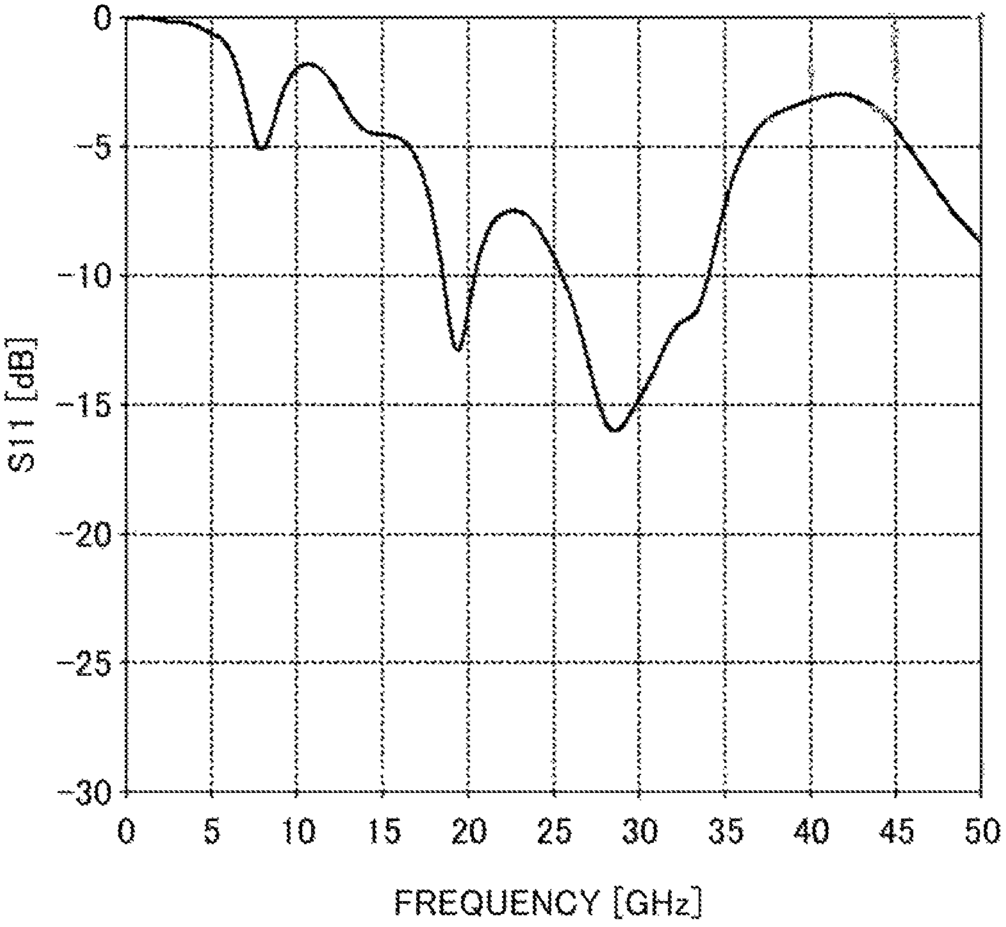
FIG. 19 is a diagram illustrating frequency characteristics of the S11 parameter of the antenna device 100M2 where there is one director 115 and the gap G is set to 4 mm.

FIG. 19 is a diagram illustrating frequency characteristics of the S11 parameter of the antenna device 100M2 in which there is only one director 115 and the gap G is set to 4 mm. The antenna device 100M2 in which there is only one director 115 and the gap G is set to 4 mm is configured so as to obtain the maximum gain when there is only one director 115 (see FIG. 18B).

FIG. 19 illustrates frequency characteristics of the S11 parameter obtained by an electromagnetic field simulation performed by setting the resonance frequency of the antenna device 100M2 to 28 GHz. An adequate bandwidth in which the S11 parameter becomes −5 dB or less was obtained at around 28 GHz.

Figure 20:
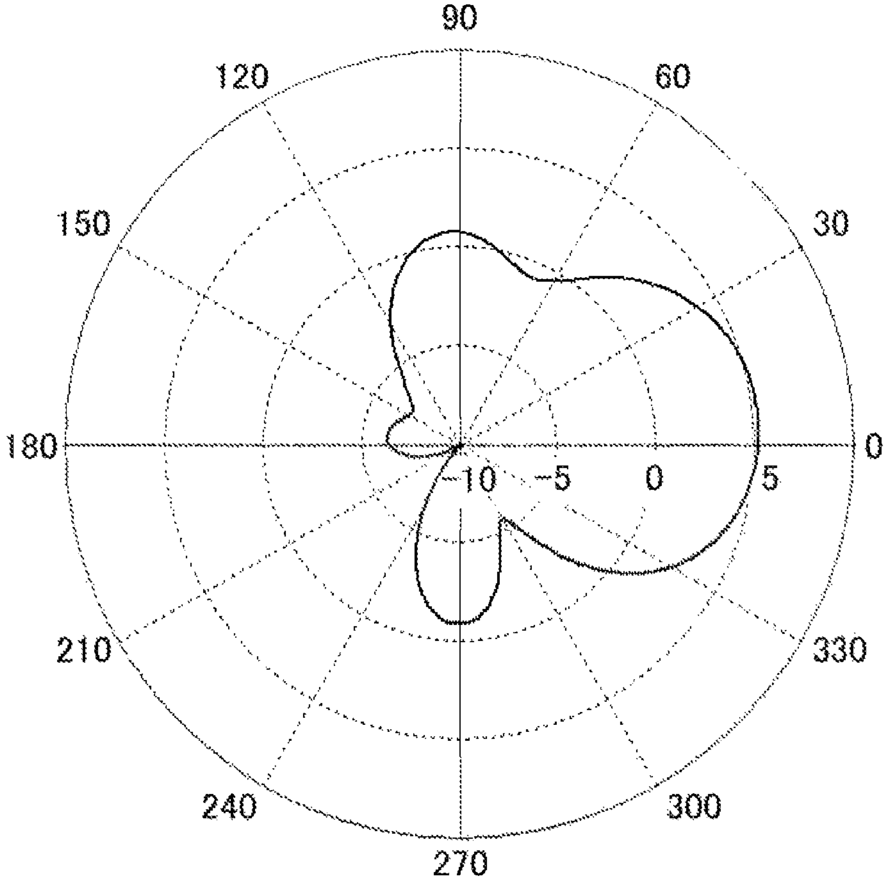
FIG. 20 is a drawing illustrating a directivity derived by an electromagnetic simulation that is performed when the resonant frequency of the antenna device 100M2, of which the number of directors 115 is one and of which the gap G is set to 4 mm, is set to 28 GHz.

FIG. 20 is a diagram illustrating the directivity obtained by an electromagnetic field simulation performed by setting, to 28 GHz, the resonance frequency of the antenna device 100M2 in which there is only one director 115 and the gap G is set to 4 mm. The directivity illustrated in FIG. 20 is the directivity of the main lobe of the antenna device 100M2. The direction of 0 degrees corresponds to the +Z direction, and the direction of 90 degrees corresponds to the +X direction. As illustrated in FIG. 20, it can be understood that the directivity in the +Z direction (0 degree direction) was obtained.

It is considered that the directivity in the case where the antenna device 100M2 in which there is only one director 115 and the gap G is set to 4 mm is attached to the electronic apparatus 200 is substantially the same as the directivity in the case where the antenna device 100 is attached to the electronic apparatus 200 as illustrated in FIG. 10.

Figure 21:
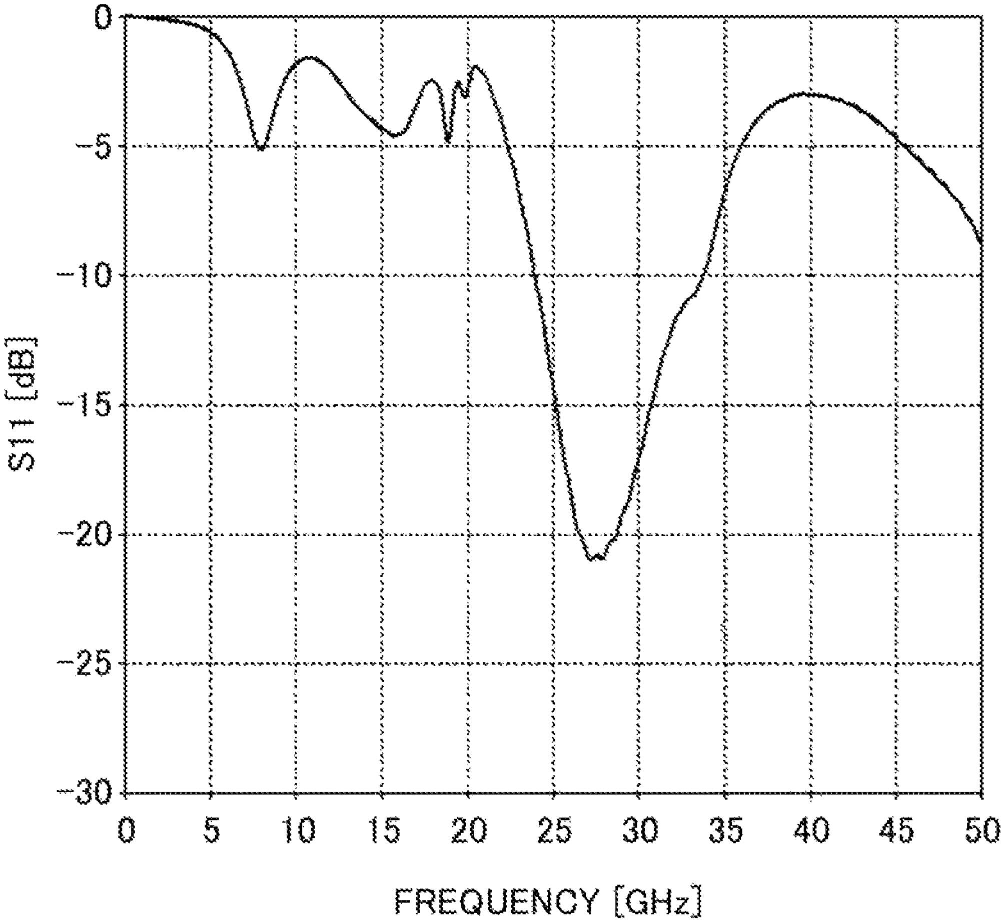
FIG. 21 is a diagram illustrating frequency characteristics of the S11 parameter of the antenna device 100M2 of which the number of directors 115 is 5 and of which the gap G is set to 1 mm.

FIG. 21 is a diagram illustrating frequency characteristics of the S11 parameter of the antenna device 100M2 of which the number of directors 115 is 5 and of which the gap G is set to 1 mm. The antenna device 100M2 of which the number of directors 115 is 5 and of which the gap G is set to 1 mm is configured so as to obtain the maximum gain when the number of directors 115 is 5 (see FIG. 18B).

FIG. 21 illustrates frequency characteristics of the S11 parameter obtained by an electromagnetic field simulation performed by setting the resonance frequency of the antenna device 100M2 to 28 GHz. An adequate bandwidth in which the S11 parameter becomes −5 dB or less was obtained at around 28 GHz.

Figure 22:
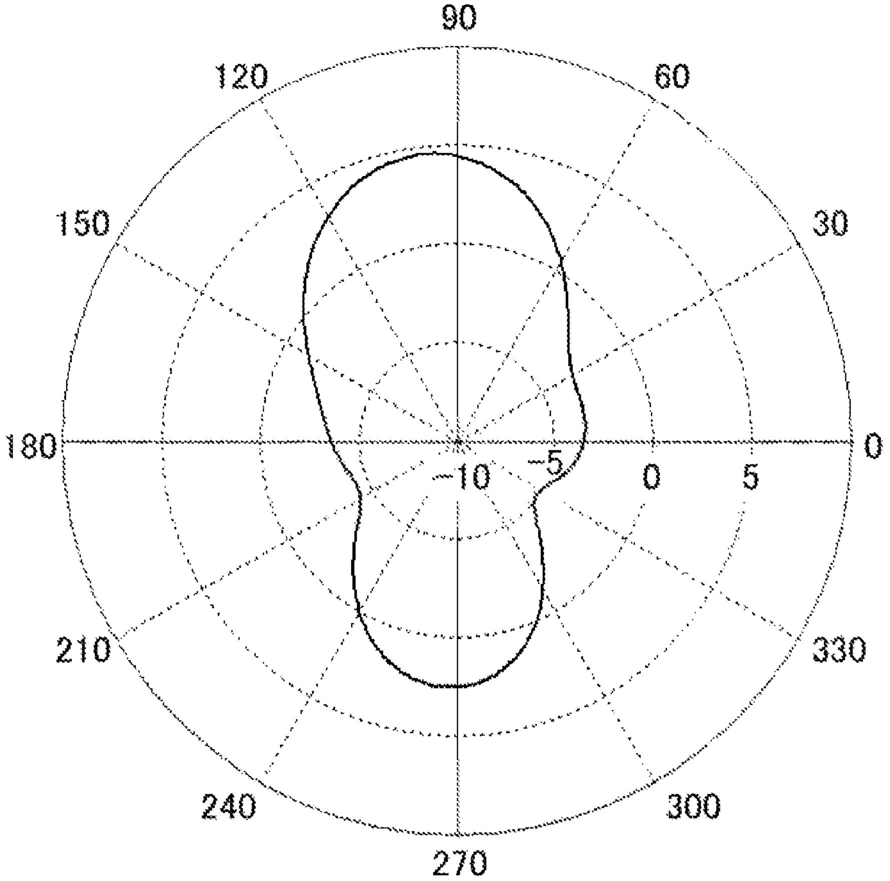
FIG. 22 is a drawing illustrating a directivity derived by an electromagnetic simulation that is performed when the resonant frequency of the antenna device 100M2, of which the number of directors 115 is 5 and of which the gap G is set to 1 mm, is set to 28 GHz.

FIG. 22 is a diagram illustrating the directivity obtained by an electromagnetic field simulation performed by setting, to 28 GHz, the resonance frequency of the antenna device 100M2 of which the number of directors 115 is 5 and of which the gap G is set to 1 mm. The directivity illustrated in FIG. 22 is the directivity of the main lobe of the antenna device 100M2. As illustrated in FIG. 22, it can be understood that the directivity in the +X direction (90 degrees direction) was obtained.

The directivity in the case where the antenna device 100M2 of which the number of directors 115 is 5 and of which the gap G is set to 1 mm is attached to the electronic apparatus 200 is a vertically upward direction with respect to the transparent cover 220 of the electronic apparatus 200.

Figure 23:
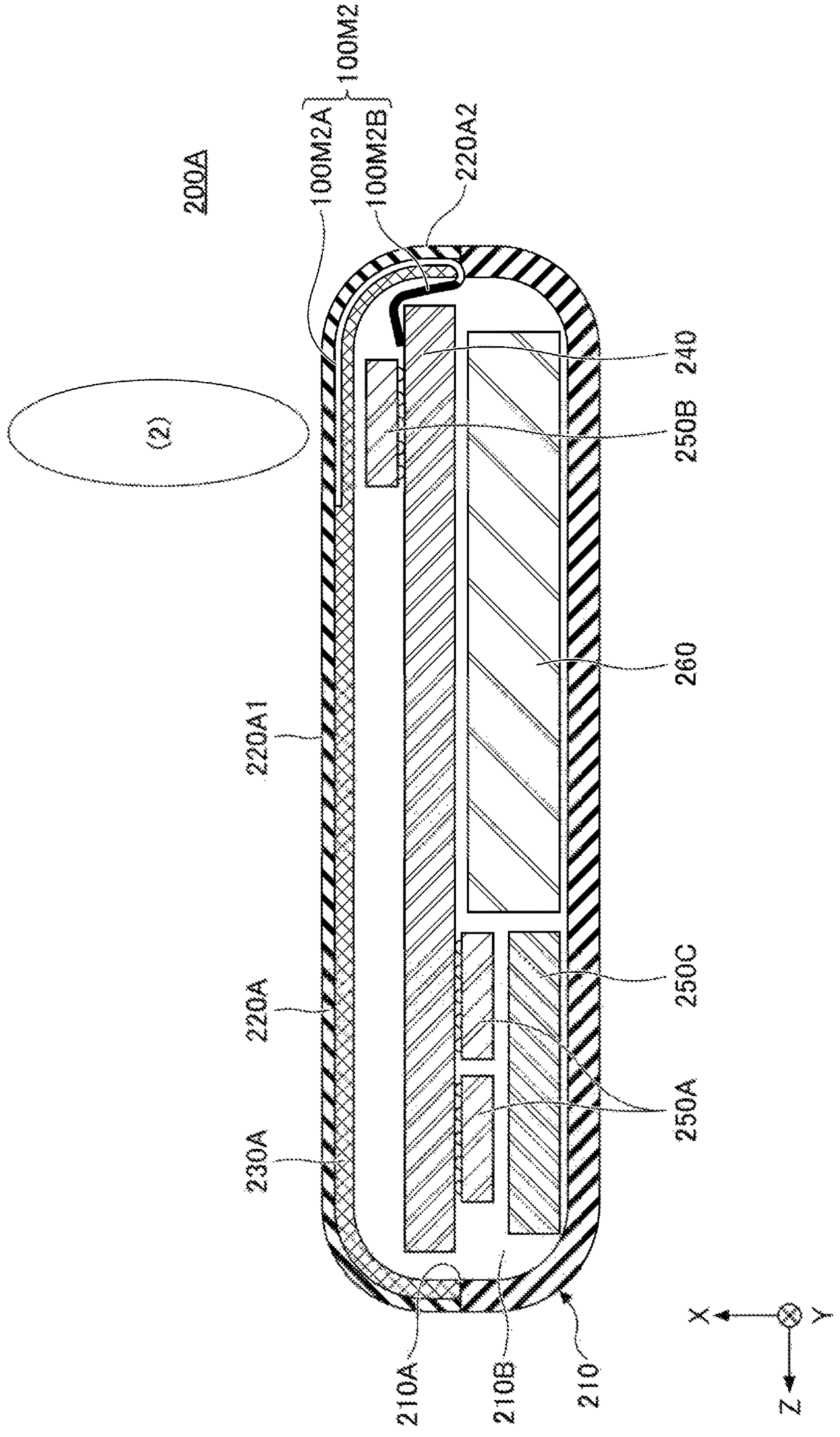
FIG. 23 is a drawing in which the directivity of the antenna device 100M2 is indicated in an exemplary cross-section of the electronic apparatus 200A.

FIG. 23 is a drawing illustrating the directivity of the antenna device 100M2 in an exemplary cross section of the electronic apparatus 200A. For the ease of understanding of the positions of the portions 100M2A and 100M2B, the portion 100M2A is illustrated in white with an outline, and the portion 100M2B is illustrated in gray.

In FIG. 23, the portion 100M2A of the antenna device 100M2 is provided over an upper surface portion 220A1 of the transparent cover 220A and a curved portion 220A2 on the −Z direction side. The portion 100M2A is a portion that is provided with the antenna element 110 illustrated in FIGS. 16 and 17, the director 115, and a portion of the microstrip line 120 on the +Z direction side, and is a transparent portion. The portion 100M2B of the antenna device 100M2 is provided on the rear side of the display operation unit 230A. The portion 100M2B is a portion that is provided with the remaining portion not included in the portion 100A of the microstrip line 120 illustrated in FIGS. 16 and 17, and is a non-transparent portion.

In FIG. 23, the portion 100M2A of the antenna device 100M2 is illustrated between the transparent cover 220A and the display operation unit 230A for the convenience of explanation, but the portion 100M2A of the antenna device 100M2 is not limited to be provided between the display operation unit 230A and the transparent cover 220A, and may be provided between the layers 232 and 233 as illustrated in FIG. 3, between the layer 233 and the adhesive layer 234, or between the layer 232 and the display panel 231.

As described above, in the electronic apparatus 200A including the antenna device 100M2, the directivity illustrated in FIG. 22 is in the direction illustrated by (2) in FIG. 23. Specifically, the antenna device 100M2 can radiate electromagnetic waves in the direction indicated by (2) and can receive electromagnetic waves in the direction indicated by (2). The direction indicated by (2) is the direction of radiation along the direction normal to the upper surface portion 220A1 of the transparent cover 220A of the electronic apparatus 200A. The upper surface portion 220A1 of the transparent cover 220A is a portion of the surface of the transparent cover 220A and a portion of the surface of the electronic apparatus 200A. Since the antenna device 100M2 has the directivity oriented in the direction (2), the antenna device 100M2 can communicate with a communication device external to the electronic apparatus 200.

The antenna device 100M2 additionally includes a director 115 as compared with the antenna device 100. The transparent antenna element 110, the director 115, and the portion of the microstrip line 120 that is included in the portion 100M2A are provided at a position visible from the outside of the transparent cover 220, and are stacked on the display panel 231 (see FIG. 3).

Thus, the antenna device 100M2 can be provided that includes the transparent antenna element 110 that can be provided at a position visible from the outside of the transparent cover 220 of the electronic apparatus 200, the transparent director 115, the transparent portion of the microstrip line 120 that is included in the portion 100M2A, and the transparent substrate 101.

Furthermore, the antenna element 110, the director 115, and the microstrip line 120 can be formed very thin. For example, when the allowable thickness of the antenna device 100M2 is greatly limited, e.g., 100 μm or less, it is difficult to use an antenna device such as a patch antenna which requires a certain thickness for the ground layer. In this regard, the antenna device 100M2 including the antenna element 110, the director 115, and the microstrip line 120, which can be formed very thin, is very advantageous from the viewpoint of reduction in the thickness.

Figure 24:
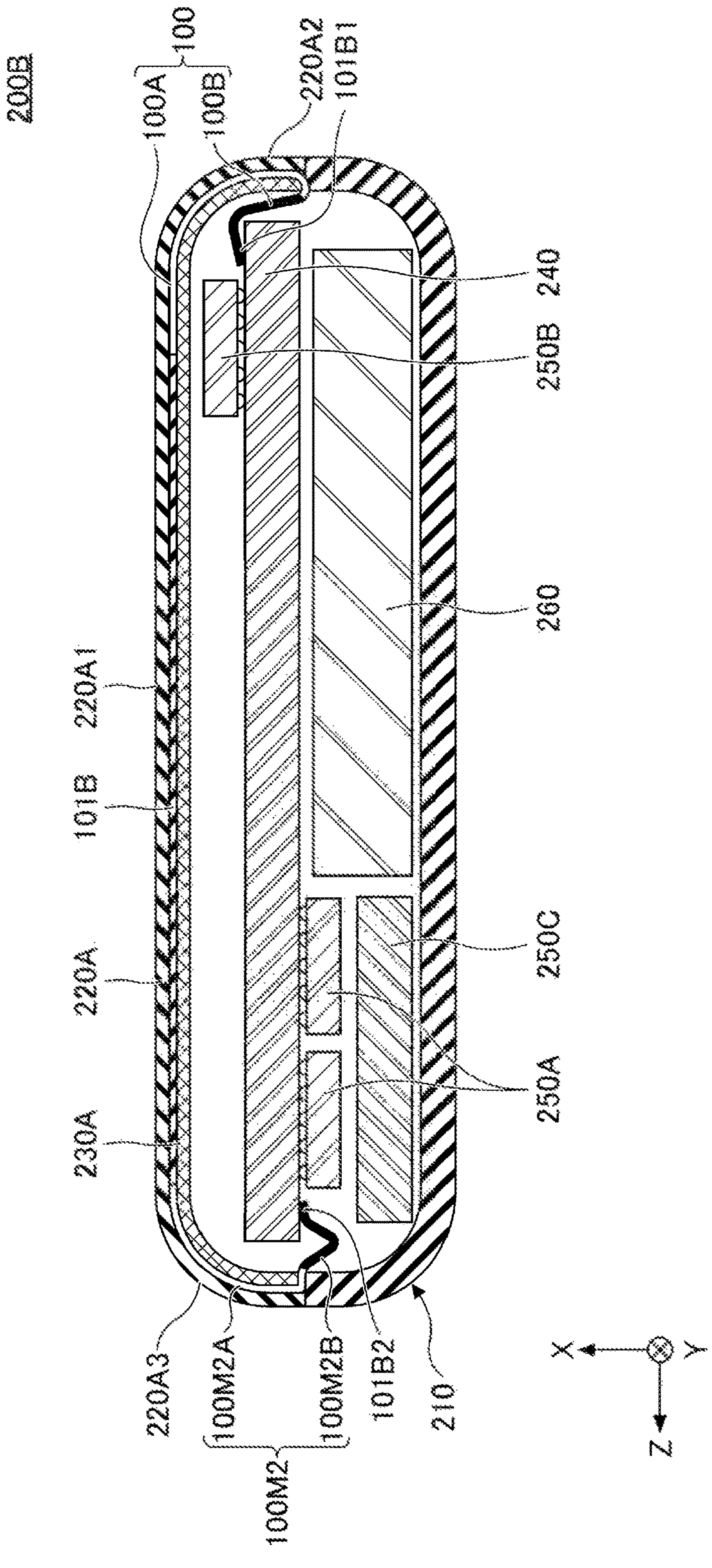
FIG. 24 is a cross sectional view illustrating an electronic apparatus 200B according to a modified embodiment of the embodiment.

FIG. 24 is a cross-sectional view illustrating an electronic apparatus 200B according to a modified embodiment of the embodiment. FIG. 24 illustrates a cross section corresponding to FIG. 11. The electronic apparatus 200B includes an antenna device 100 and an antenna device 100M2. The antenna device 100 and the antenna device 100M2 include a common substrate 101B instead of the substrate 101 illustrated in FIGS. 4, 5, 16, and 17. The antenna device 100 and the antenna device 100M2 may have configurations with resonance frequencies different from each other.

The substrate 101B is larger than the display operation unit 230A in a plan view, and is provided over the entire area between the transparent cover 220A and the display operation unit 230A. The end portions 101B1, 101B2 of the substrate 101B are bent and situated on the rear side of the display operation unit 230A, and are connected to the circuit board 240. The antenna device 100 is provided on the upper surface portion 220A1 and the curved portion 220A2 on the −Z direction side. The antenna device 100M2 is provided on the upper surface portion 220A1 and a curved portion 220A3 on the +Z direction side. Therefore, in the portion where the antenna device 100 and the antenna device 100M2 are not provided, only the substrate 101B is provided in the Z direction between the transparent cover 220A and the display operation unit 230A.

The reason why the substrate 101B is made larger than the display operation unit 230A in a plan view and the end portions 101B1, 101B2 of the substrate 101B are provided on the rear side of the display operation unit 230A is to prevent the end portions 101B1, 101B2 from being seen from the outside of the transparent cover 220A in consideration of the case where the end portions 101B1, 101B2 of the substrate 101B are conspicuous.

Therefore, the end portions 101B1, 101B2 may be situated on the rear side of the display operation unit 230A including the display panel 231 (see FIG. 3), and do not have to be connected to the circuit board 240 as illustrated in FIG. 24.

The end portion of the substrate 101B is bent and positioned on the rear side of the display operation unit 230A in the XY section. This is to prevent the end portions of the substrate 101B from being seen from the outside of the transparent cover 220A.

In FIG. 24, the portion 100A of the antenna device 100 is provided over the flat upper surface portion 220A1 and the curved portion 220A2 of the transparent cover 220A. The range of the portion 100A is substantially the same as FIG. 11. The range of the portion 100B is also substantially the same as FIG. 11. In FIG. 24, the portion 100A of the antenna device 100 is illustrated between the transparent cover 220A and the display operation unit 230A for the convenience of explanation, but the portion 100A of the antenna device 100 is not limited to be provided between the display operation unit 230A and the transparent cover 220A, and may be provided between the layers 232 and 233 illustrated in FIG. 3, between the layer 233 and the adhesive layer 234, or between the layer 232 and the display panel 231.

In FIG. 24, the portion 100M2A of the antenna device 100M2 is provided over the curved portion 220A3 of the transparent cover 220A on the +Z direction side and the upper surface portion 220A1. In FIG. 24, the portion 100M2A of the antenna device 100M2 is illustrated between the transparent cover 220A and the display operation unit 230A for the convenience of explanation, but the portion 100M2A of the antenna device 100M2 is not limited to be provided between the display operation unit 230A and the transparent cover 220A, and may be provided between the layers 232 and 233 illustrated in FIG. 3, between the layer 233 and the adhesive layer 234, or between the layer 232 and the display panel 231.

The antenna device 100 and the antenna device 100M2 includes a substrate 101B larger than the display operation unit 230A, and has the end portions 101B1, 101B2 of the substrate 101B situated on the rear side of the display operation unit 230A.

Therefore, the antenna device 100 and the antenna device 100M2 with a high design, in which the end portions 101B1, 101B2 of the substrate 101B are not visible from the outside of the transparent cover 220A, can be provided.

Although the aspect in which the electronic apparatus 200B includes the antenna device 100 and the antenna device 100M2 has been described, the configuration may be such that any one of the antenna device 100 and the antenna device 100M2 is included. The electronic apparatus 200B may include an antenna device other than the antenna device 100 and the antenna device 100M2, or may include 3 or more antenna devices.

When the electronic apparatus 200B includes multiple antenna devices with resonance frequencies different from each other, the electronic apparatus 200B capable of communicating in multiple communication bands can be provided.

Figure 25:
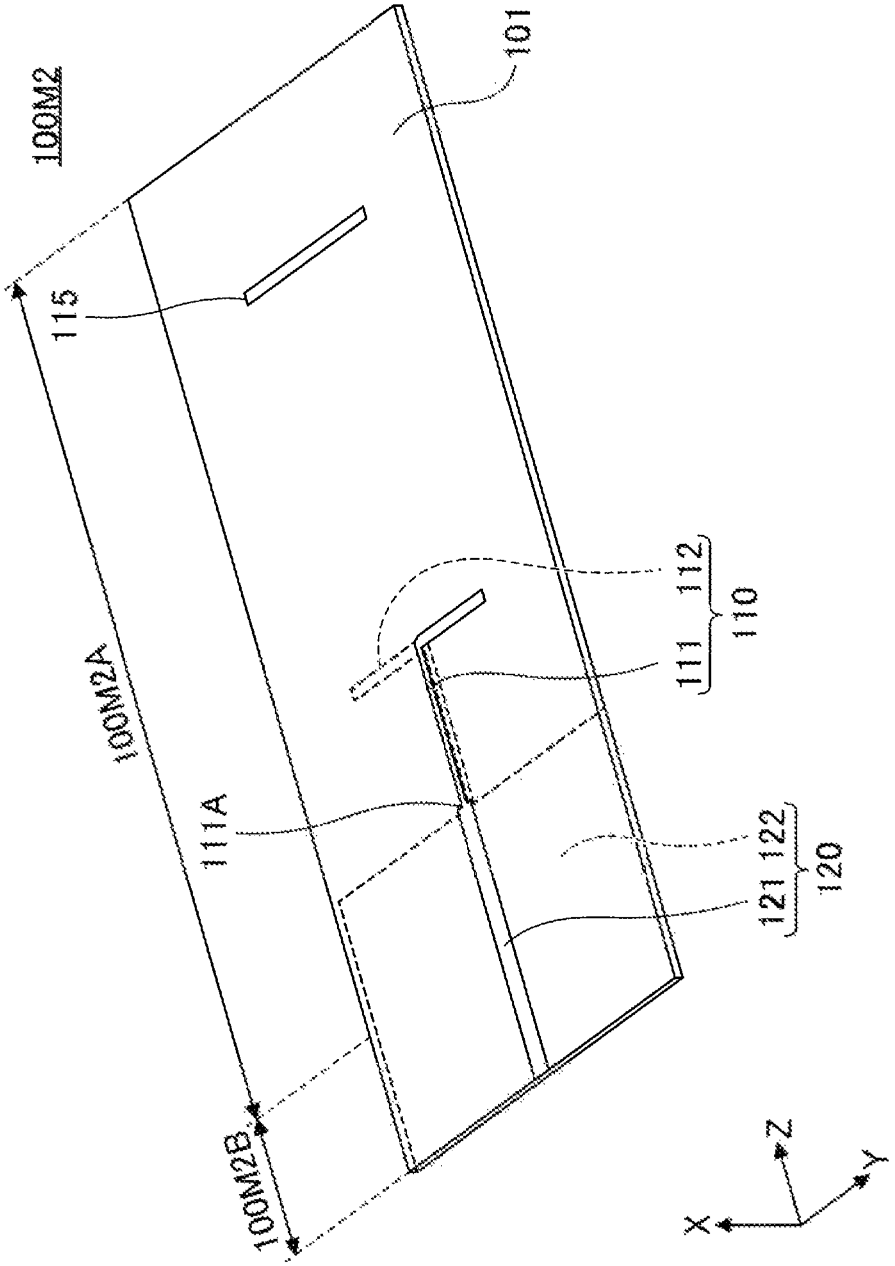
FIG. 25 is a drawing illustrating the antenna device 100M2.

FIG. 25 is a drawing illustrating the antenna device 100M2. The antenna device 100M2 includes a substrate 101, an antenna element 110, a director 115, and a microstrip line 120. The antenna element 110 includes elements 111 and 112, and the microstrip line 120 has a transmission line 121 and a ground layer 122.

Figure 26B:
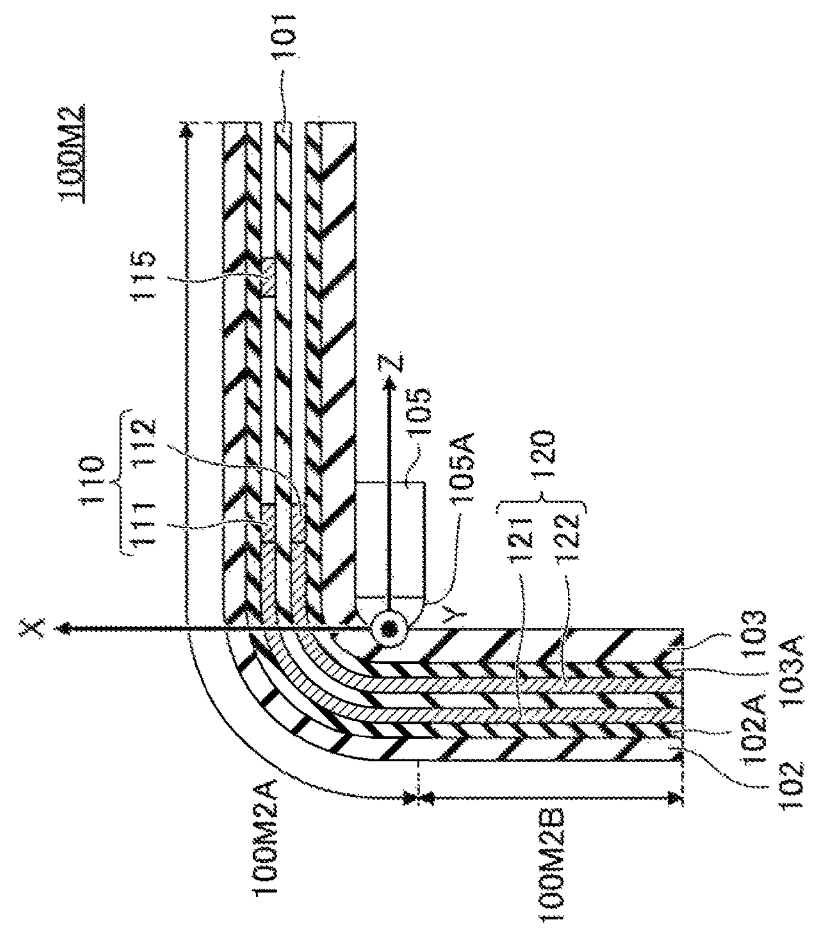
FIGS. 26A and 26B are drawings for explaining a method for bending the antenna device 100M2.
Figure 26A:
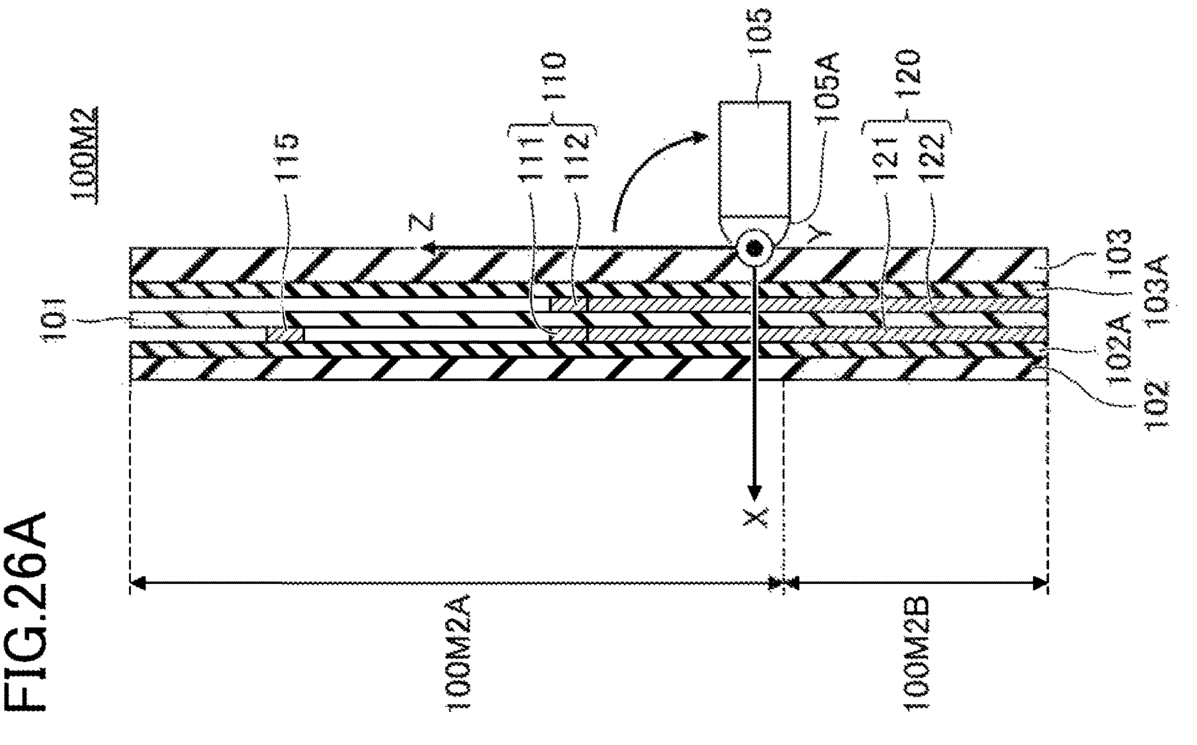

In this case, a model in which the antenna device 100M2 is bent at the feeding point 111A in the Z direction is studied. FIGS. 26A and 26B is a drawing for explaining a method of bending the antenna device 100M2. FIGS. 26A and 26B illustrates portions 100M2A, 100M2B, for example.

FIG. 26A illustrates an antenna device 100M2 in an unbent state, and FIG. 26B illustrates an antenna device 100M2 in a bent state. Although the bending of the antenna device 100M2 is performed by using a simulation model, the bending of the antenna device 100M2 is hereinafter explained by using a virtual jig 105 in order to allow easy understanding of the explanation.

The model of the antenna device 100M2 includes covers 102 and 103 as illustrated in FIGS. 26A and 26B. The covers 102 and 103 are attached to the surfaces of the antenna device 100M2 on the +X direction side and the −X direction side by adhesive layers 102A and 103A, respectively. The size of the covers 102 and 103 is equal to the size of the substrate 101.

The jig 105 is curved with a radius of 1 mm in the XZ cross-section, and includes an end portion 105A that is long in the Y direction. As illustrated in FIG. 26A, the end portion 105A is pressed against the surface of the antenna device 100M2 in the −X direction. When the position of the end portion 105A in the Z direction is Z=0 mm, the end portion 105A is at the position of the feeding point 111A. That is, when the position of the end portion 105A in the Z direction is Z=0 mm, the position of the end portion 105A in the Z direction is equal to the position of the boundary between the antenna element 110 and the microstrip line 120.

As illustrated in FIG. 26B, the antenna device 100M2 on the side of the antenna element 110 is bent 90 degrees in the clockwise direction in FIG. 26B with respect to the side of the microstrip line 120. In this case, the XYZ coordinates are similarly rotated by 90 degrees. That is, even after the bending, the +Z direction is the direction of the endfire of the antenna element 110.

Figure 27A:
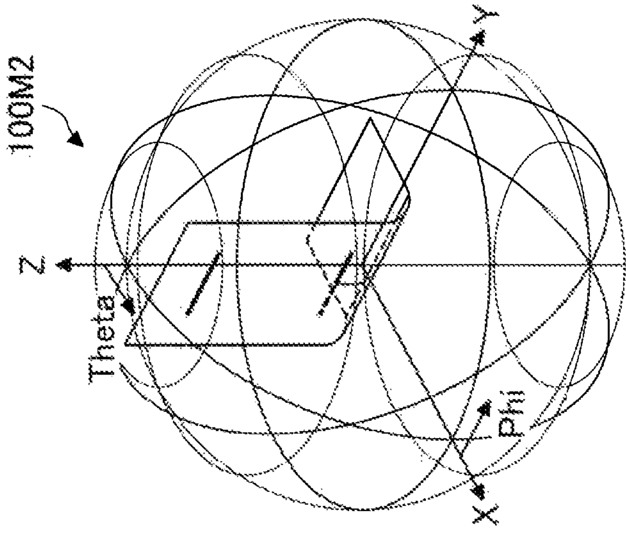
FIGS. 27A to 27C are drawings illustrating a bending model of the antenna device 100M2.
Figure 27B:
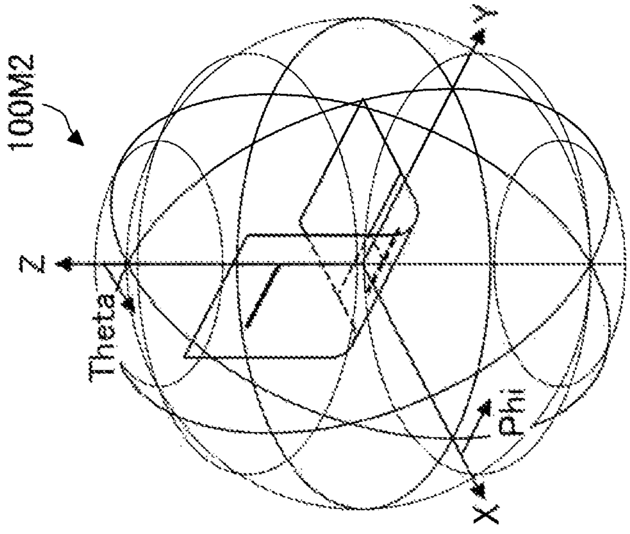
Figure 27C:
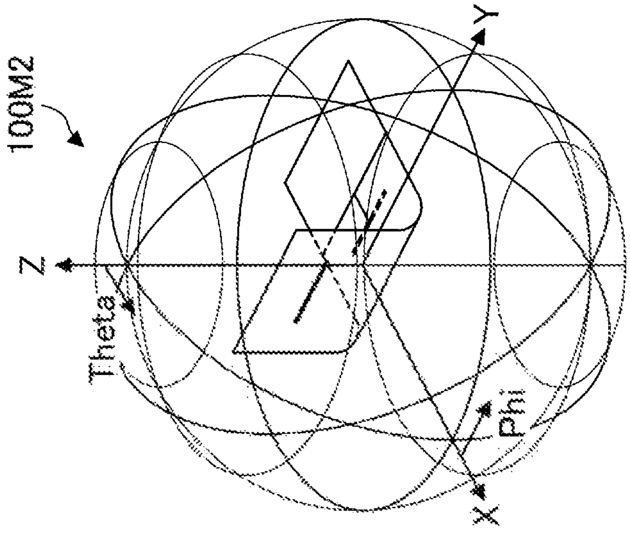

When the antenna device 100M2 is bent in such a manner that the jig 105 is positioned at three different positions, Z=0 mm, Z=2 mm, and Z=4 mm, the models illustrated in FIGS. 27A to 27C is obtained. FIGS. 27A to 27C are diagrams illustrating a bending model of the antenna device 100M2.

The model illustrated in FIG. 27A is a model of the antenna device 100M2 bent at the position Z=0 mm. The model illustrated in FIG. 27B is a model of the antenna device 100M2 bent at the position Z=2 mm. The model illustrated in FIG. 27C is a model of the antenna device 100M2 bent at the position Z=4 mm.

When the position of the jig 105 is changed from Z=0 mm to Z=2 mm and Z=4 mm, the position of the jig 105 is shifted toward the +Z direction from the boundary between the antenna element 110 and the microstrip line 120. Accordingly, in the case where Z=2 mm and Z=4 mm, the antenna element 110 is bent at some point thereof.

Figure 28:
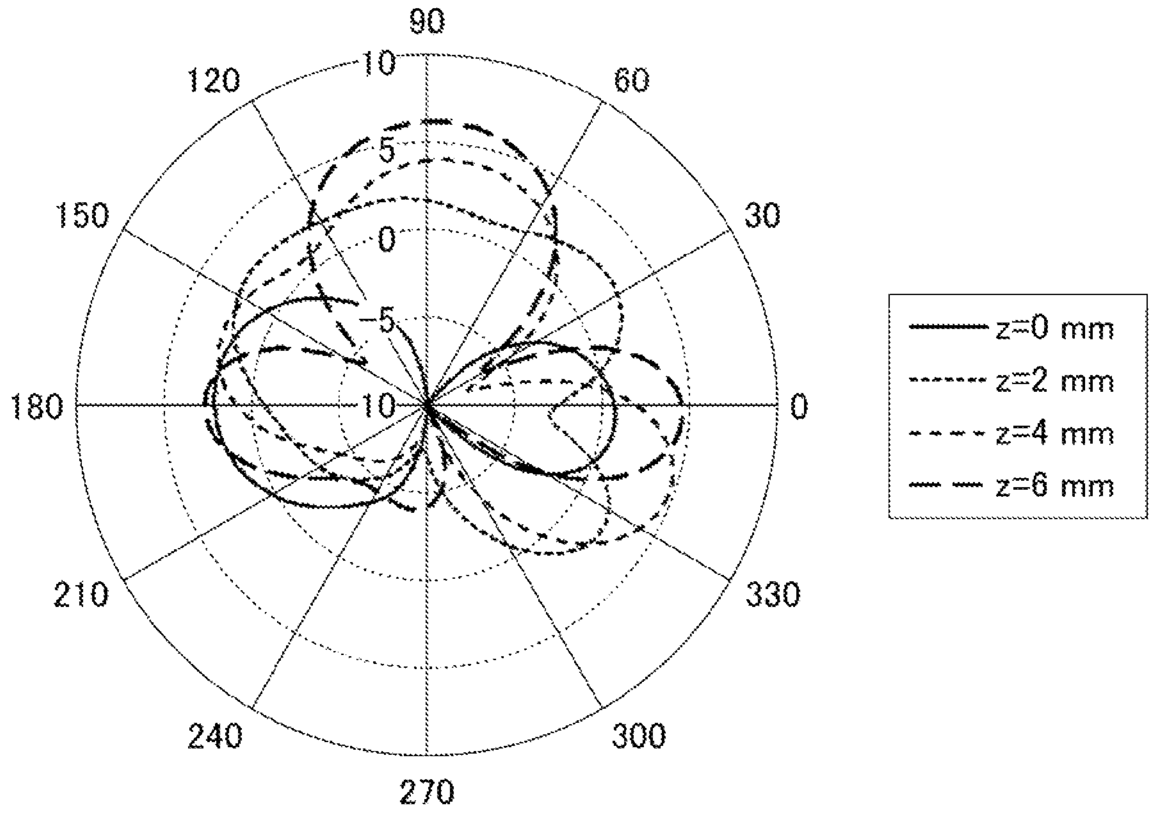
FIG. 28 is a drawing illustrating the directivity of the antenna device 100M2 of which the bending position is different.

FIG. 28 is a drawing illustrating the directivity of the antenna device 100M2 with different bending positions. FIG. 28 illustrates the directivity obtained with four models of the antenna device 100M2 with the bending positions Z=0 mm, Z=2 mm, Z=4 mm, and Z=6 mm.

It can be understood that at Z=0 mm, a directivity in the backfire direction in the 180 degrees direction (−Z direction) is exhibited, and at Z=2 mm, 4 mm, and 6 mm, a directivity in the vertically upward direction in the 90 degrees direction (+X direction) is exhibited.

Thus, it has been found that the directivity of the antenna device 100M2 can be adjusted by changing the bending position.

Figure 29A:
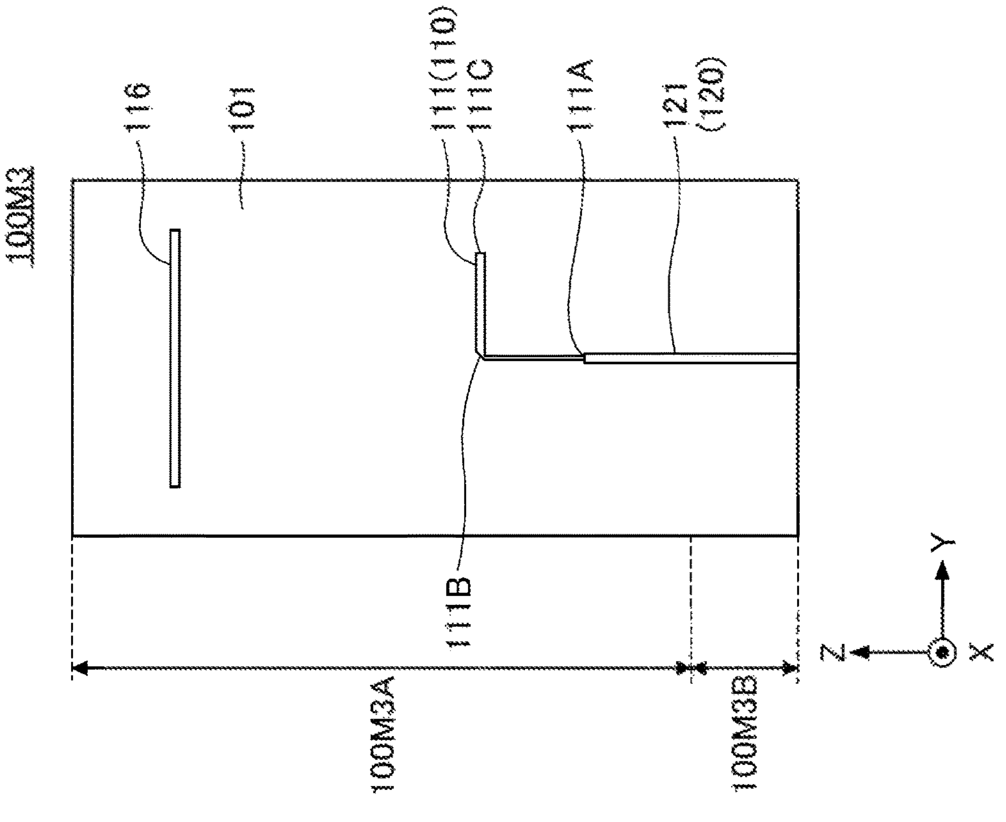
FIGS. 29A and 29B are drawings illustrating an antenna device 100M3 according to a modified embodiment of the embodiment.
Figure 29B:
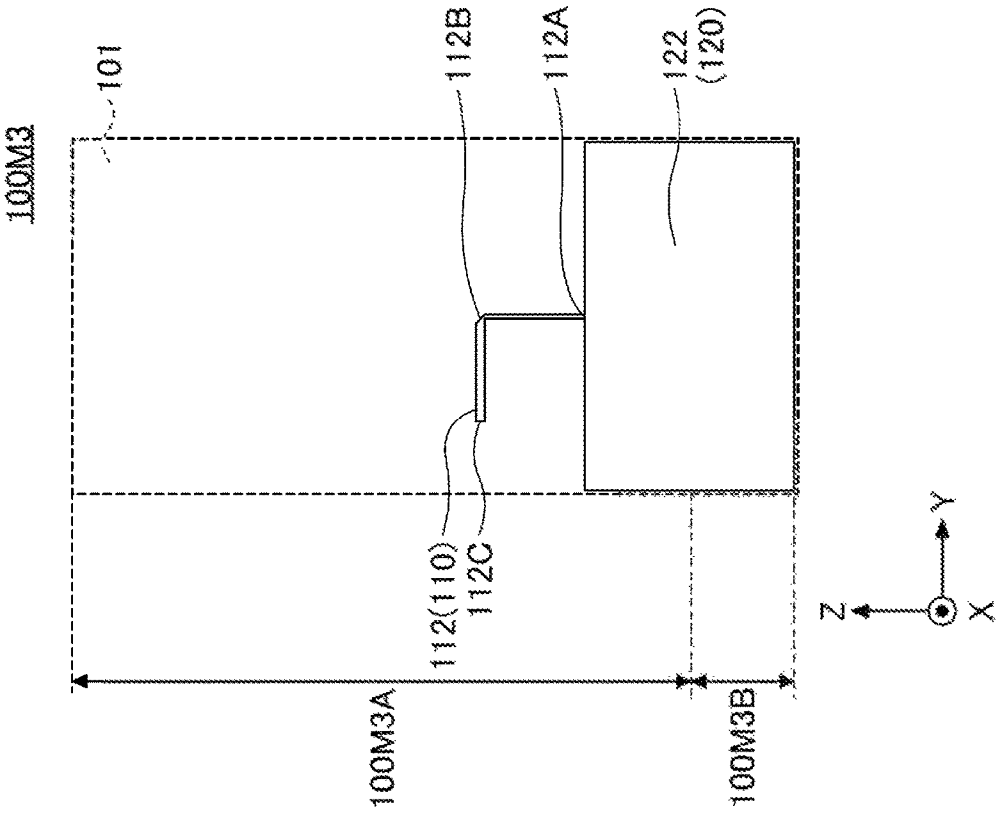

FIGS. 29A and 29B are drawings illustrating an antenna device 100M3 according to a modified embodiment of the embodiment. The antenna device 100M3 includes a substrate 101, an antenna element 110, a reflector 116, and a microstrip line 120. The antenna device 100M3 includes a reflector 116 instead of the director 115 of the antenna device 100M2 illustrated in FIGS. 16 and 17. Similar to the antenna element 110, the reflector 116 is implemented by a transparent conductor 300A (see FIG. 6).

The antenna device 100M3 includes portions 100M3A and 100M3B. The portions 100M3A and 100M3B are substantially the same as the portions 100A and 100B illustrated in FIGS. 1, 2, 4, and 5, with the portion 100M3A being visible from the outside of the electronic apparatus 200 or 200A through the transparent cover 220 or 220A of the electronic apparatus 200 or 200A when attached to the electronic apparatus 200 or 200A, and the portion 100M3B being situated on the rear side of display operation unit 230 or 230A and being not visible from the outside of the electronic apparatus 200 or 200A.

FIGS. 29A and 29B illustrate, for example, a configuration in which the boundary between the portion 100M3A and the portion 100M3B is ½ from the end portion, on the +Z direction side, of the microstrip line 120 in the Z direction.

The length of the reflector 116 in the Y direction is slightly longer than the length in the Y direction between the open end 111C and the open end 112C of the antenna element 110.

Figure 30:
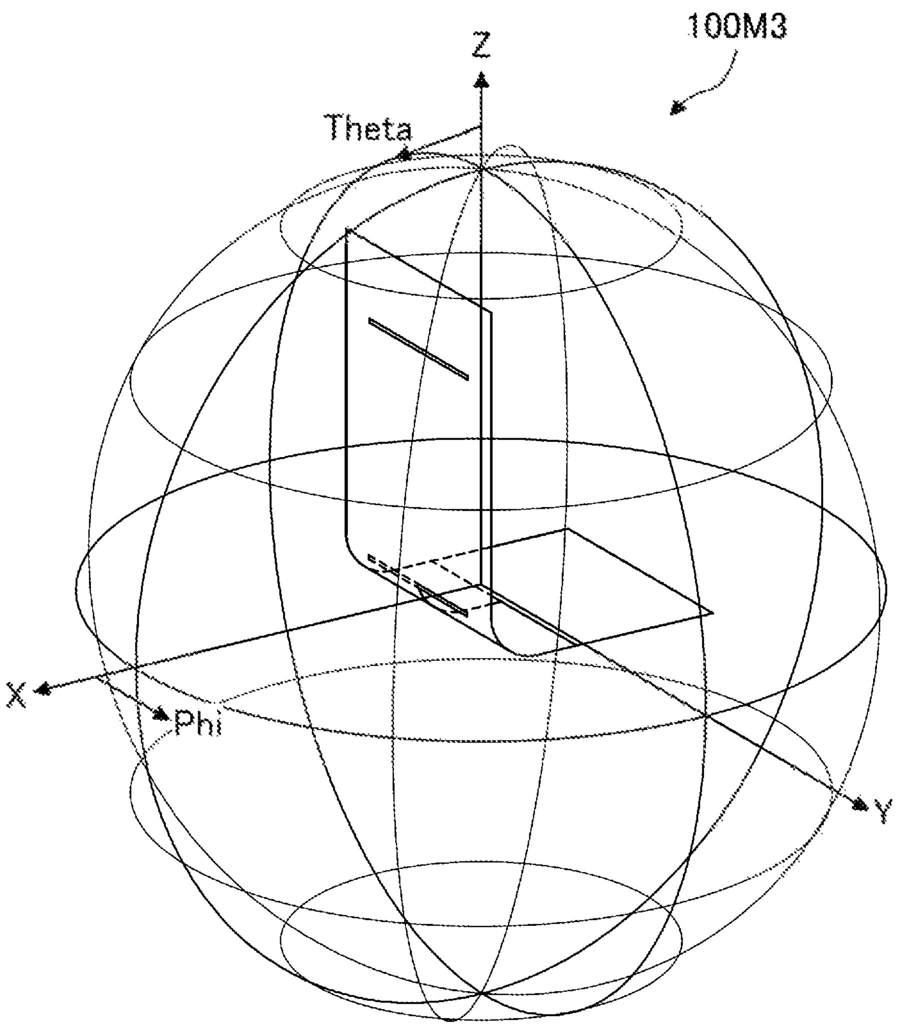
FIG. 30 is a drawing illustrating a model of the antenna device 100M3.

FIG. 30 is a diagram illustrating a model of the antenna device 100M3. The antenna device 100M3 illustrated in FIG. 30 is bent at the position Z=1 mm. The position of Z=1 mm is a position that is away by 1 mm from the feeding point 111A toward the +Z direction side.

Figure 31:
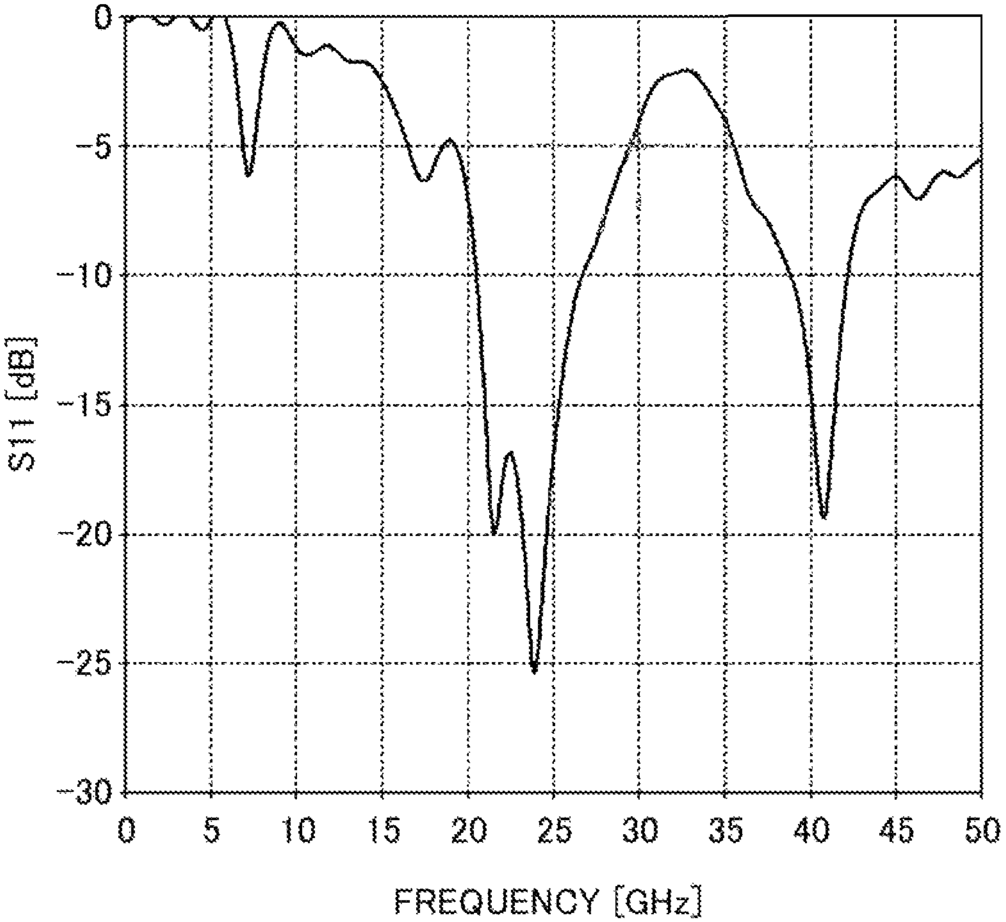
FIG. 31 is a diagram illustrating frequency characteristics of the S11 parameter of the antenna device 100M3 that is bent at the position of Z=1 mm.

FIG. 31 is a diagram illustrating the frequency characteristics of the S11 parameter of the antenna device 100M3 bent at the position Z=1 mm. FIG. 31 illustrates the frequency characteristics of the S11 parameter obtained by an electromagnetic field simulation performed by setting the resonance frequency of the antenna device 100M3 to 28 GHz. A band in which the S11 parameter becomes −5 dB or less was obtained at around 28 GHz, which is preferable. A band in which the S11 parameter is −5 dB or less at about 41 GHz occurred unintentionally.

Figure 32:
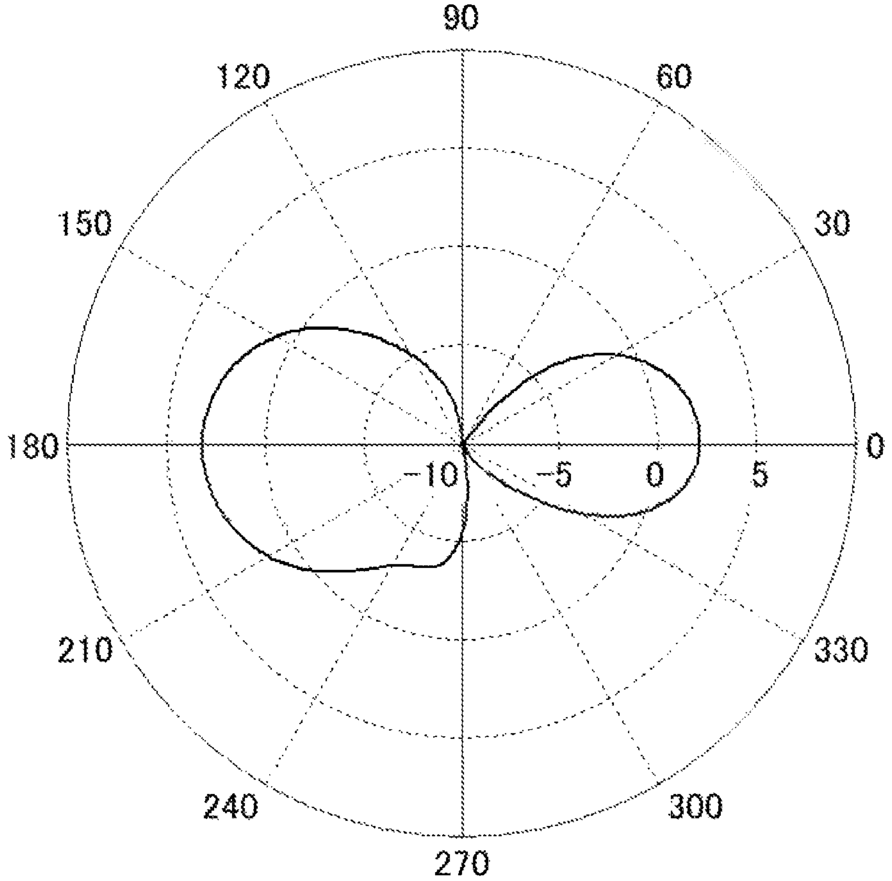
FIG. 32 is a drawing illustrating a directivity derived by an electromagnetic simulation that is performed when the resonant frequency of the antenna device 100M3 that is bent at the position of Z=1 mm is set to 28 GHz.

FIG. 32 is a diagram illustrating the directivity obtained by an electromagnetic field simulation performed by setting the resonance frequency of the antenna device 100M3 bent at the position Z=1 mm to 28 GHz. The directivity illustrated in FIG. 32 is the directivity of the main lobe of the antenna device 100M3. The direction of 0 degrees corresponds to the +Z direction (the direction of the endfire), the direction of 90 degrees corresponds to the +X direction, and 180 degrees corresponds to the −Z direction (the direction of the backfire). As illustrated in FIG. 32, it can be understood that a directivity in the −Z direction (backfire direction) was obtained.

It is considered that the directivity in the direction of the backfire was obtained in this manner because of the synergistic effect of the fact that the antenna device 100M3 includes the reflector 116 and the ground layer 122 is bent 90 degrees with respect to the antenna element 110 to deviate from the direction of the backfire of the antenna element 110.

The antenna device 100M3 additionally includes the reflector 116 as compared with the antenna device 100 and is bent. The transparent antenna element 110 and the reflector 116 can be provided at the position visible from the outside of the transparent cover 220.

Thus, the antenna device 100M3 can be provided that includes the transparent antenna element 110 that can be provided at a position visible from the outside of the transparent cover 220 of the electronic apparatus 200, the transparent reflector 116, the transparent portion of the microstrip line 120 on the +Z direction side, and the transparent substrate 101.

Furthermore, the antenna element 110, the reflector 116, and the microstrip line 120 can be formed very thin. For example, when the allowable thickness of the antenna device 100M3 is greatly limited, e.g., 100 μm or less, it is difficult to use an antenna device such as a patch antenna which requires a certain thickness for the ground layer. In this regard, the antenna device 100M3 including the antenna element 110, the reflector 116, and the microstrip line 120, which can be formed very thin, is very advantageous from the viewpoint of reduction in the thickness.

Figure 33:
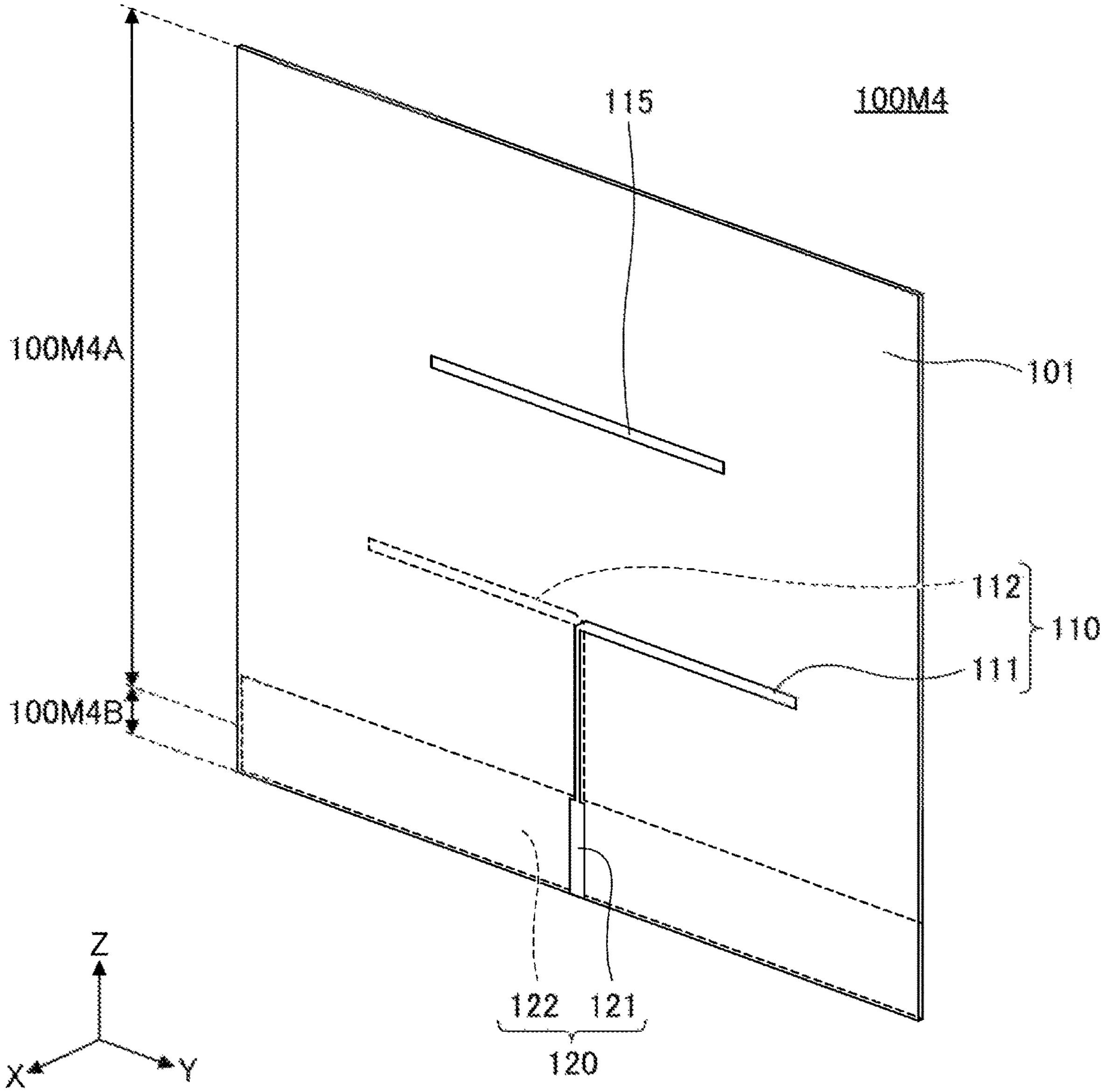
FIG. 33 is a drawing illustrating an antenna device 100M4.
Figure 34:
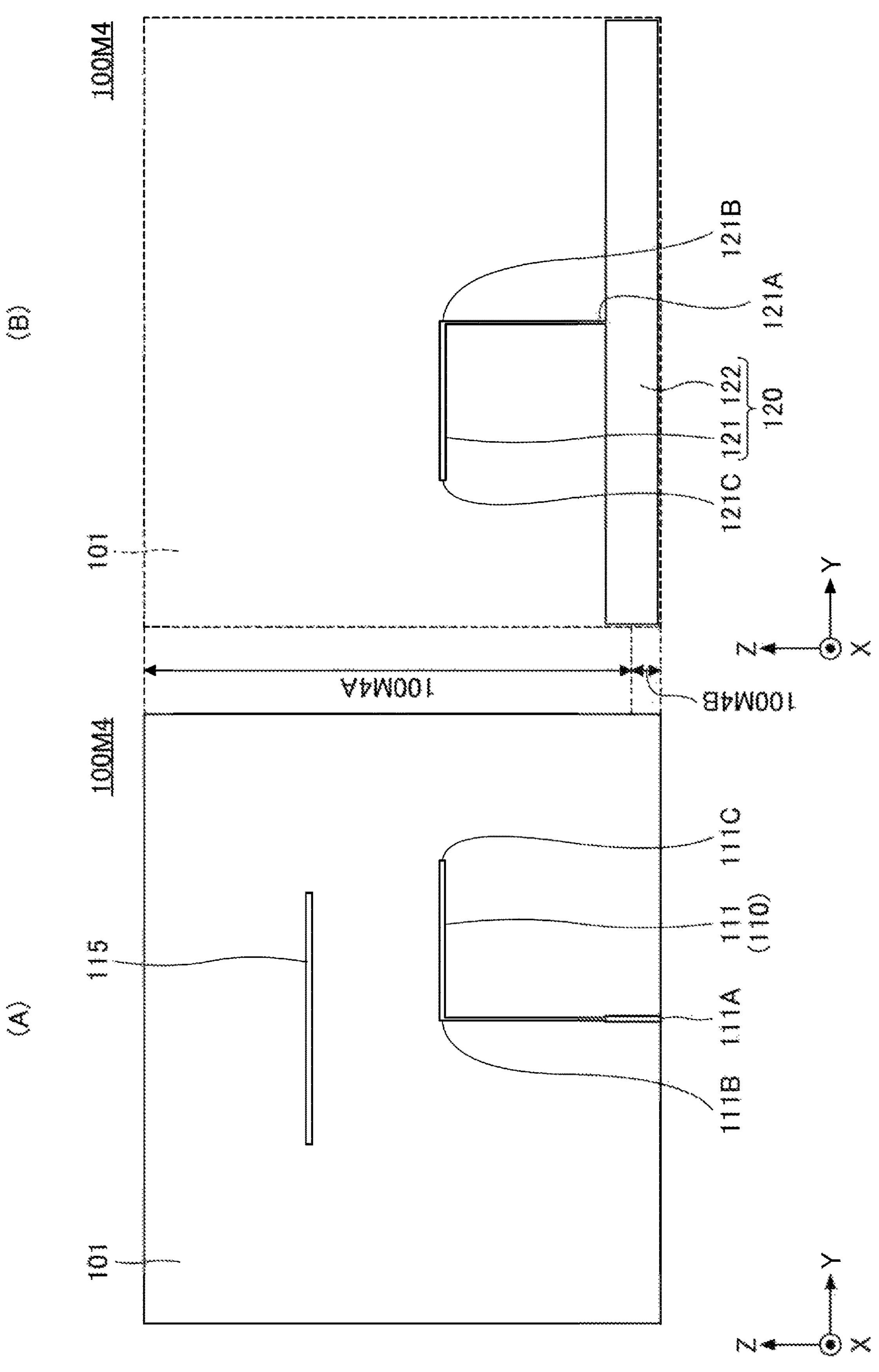
FIG. 34 is a drawing illustrating the antenna device 100M4.

FIG. 33 and FIG. 34 are drawings illustrating an antenna device 100M4. The antenna device 100M4 includes a substrate 101, an antenna element 110, a director 115, and a microstrip line 120. The antenna device 100M4 is a Yagi-Uda antenna, and has a configuration for a band less than 6 GHz (Sub6) of the fifth generation mobile communication system (5G).

The antenna device 100M4 includes portions 100M4A and 100M4B. The portions 100M4A and 100M4B are substantially the same as the portions 100A and 100B illustrated in FIGS. 1, 2, 4, and 5, with the portion 100M4A being visible from the outside of the electronic apparatus 200 or 200A through the transparent cover 220 or 220A of the electronic apparatus 200 or 200A when attached to the electronic apparatus 200 or 200A, and the portion 100M4B being situated on the rear side of the display operation unit 230 or 230A and being not visible from the outside of the electronic apparatus 200 or 200A.

FIG. 33 and FIG. 34 illustrate, for example, a configuration in which the boundary between the portion 100M4A and the portion 100M4B is ½ from the end portion, on the +Z direction side, of the microstrip line 120 in the Z direction.

FIG. 34 (A) illustrates the substrate 101 and components provided on the surface of the substrate 101 on the +X direction side, and FIG. 34 (B) illustrates components provided on the surface of the substrate 101 on the +X direction side. In FIG. 34 (B), the position of the substrate 101 is indicated by a broken line.

The antenna device 100M4 includes, for example, one director 115.

Figure 35:
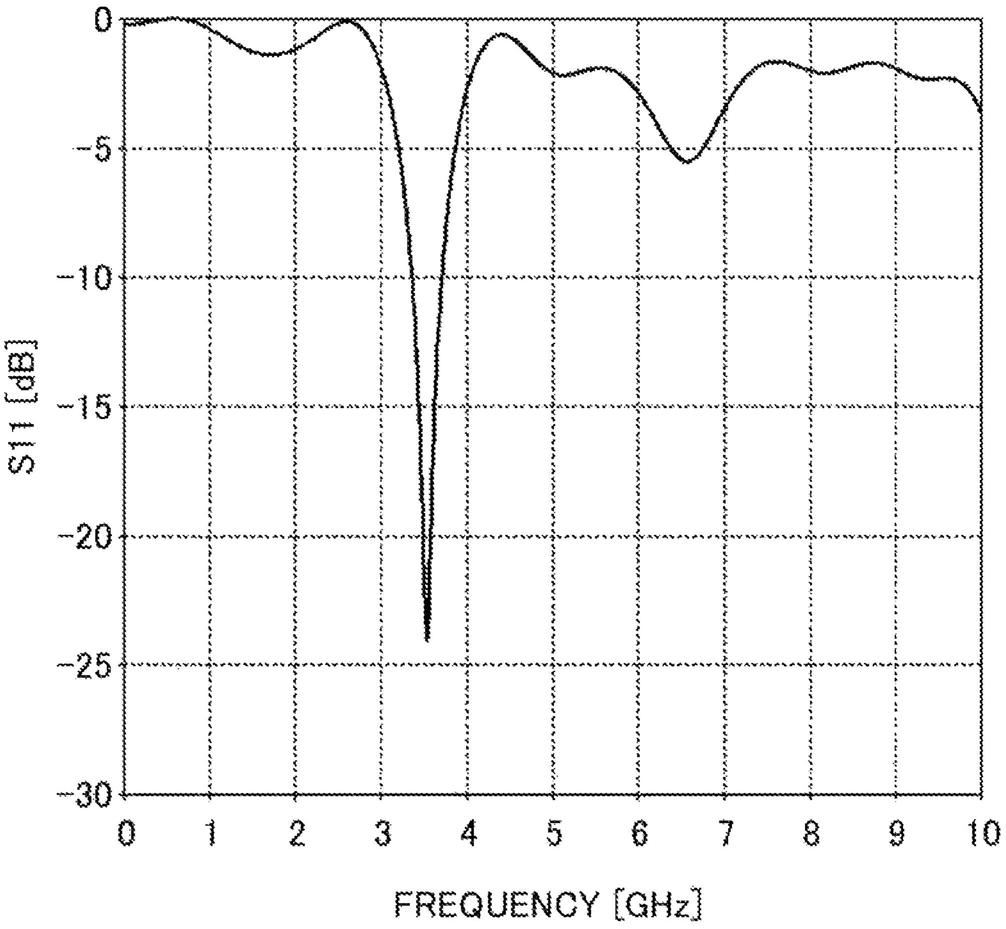
FIG. 35 is a diagram illustrating frequency characteristics of the S11 parameter of the antenna device 100M4 for Sub6 including one director 115.

FIG. 35 is a diagram illustrating frequency characteristics of the S11 parameter of the antenna device 100M4 including one director 115 for Sub6. FIG. 35 illustrates the frequency characteristics of the S11 parameter obtained by an electromagnetic field simulation performed by setting the resonance frequency of the antenna device 100M4 to 3.5 GHz. An adequate bandwidth in which the S11 parameter becomes −5 dB or less was obtained at around 3.5 GHz.

Figure 36:
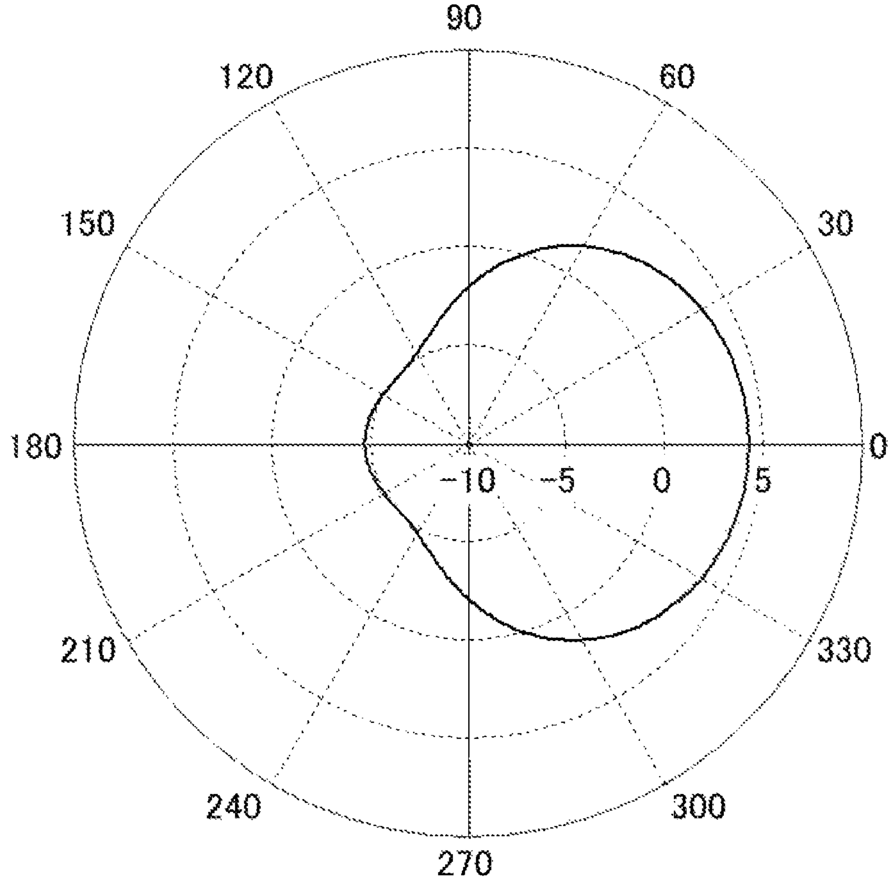
FIG. 36 is a drawing illustrating a directivity derived by an electromagnetic simulation that is performed when the resonant frequency of the antenna device 100M4 for Sub6 including one director 115 is set to 3.5 GHz.

FIG. 36 is a diagram illustrating the directivity obtained by an electromagnetic field simulation performed by setting, to 3.5 GHz, the resonance frequency of the antenna device 100M4 including one director 115 for Sub6. The directivity illustrated in FIG. 36 is the directivity of the main lobe of the antenna device 100M4. The direction of 0 degrees corresponds to the +Z direction, and the direction of 90 degrees corresponds to the +X direction. As illustrated in FIG. 36, it can be understood that the directivity in the +Z direction (0 degree direction) was obtained.

It is considered that the directivity in the case where the antenna device 100M4 including one director 115 for Sub6 is attached to the electronic apparatus 200 is substantially the same as the directivity in the case where the antenna device 100 is attached to the electronic apparatus 200 as illustrated in FIG. 10.

The antenna device 100M4 has a configuration in which the director 115 is added to the antenna device 100 and the size is changed for Sub6. The transparent antenna element 110 and the director 115 are provided at positions visible from the outside of the transparent cover 220, and are stacked on the display panel 231 (see FIG. 3).

Thus, an antenna device 100M4 can be provided that includes the transparent antenna element 110 that can be provided at a position visible from the outside of the transparent cover 220 of the electronic apparatus 200, the transparent director 115, the transparent portion of the microstrip line 120 on the +Z direction side, and the transparent substrate 101.

Furthermore, the antenna element 110, the reflector 115, and the microstrip line 120 can be formed very thin. For example, when the allowable thickness of the antenna device 100M4 is greatly limited, e.g., 100 μm or less, it is difficult to use an antenna device such as a patch antenna which requires a certain thickness for the ground layer. In this regard, the antenna device 100N4 including the antenna element 110, the reflector 115, and the microstrip line 120, which can be formed very thin, is very advantageous from the viewpoint of reduction in the thickness.

Figure 37:
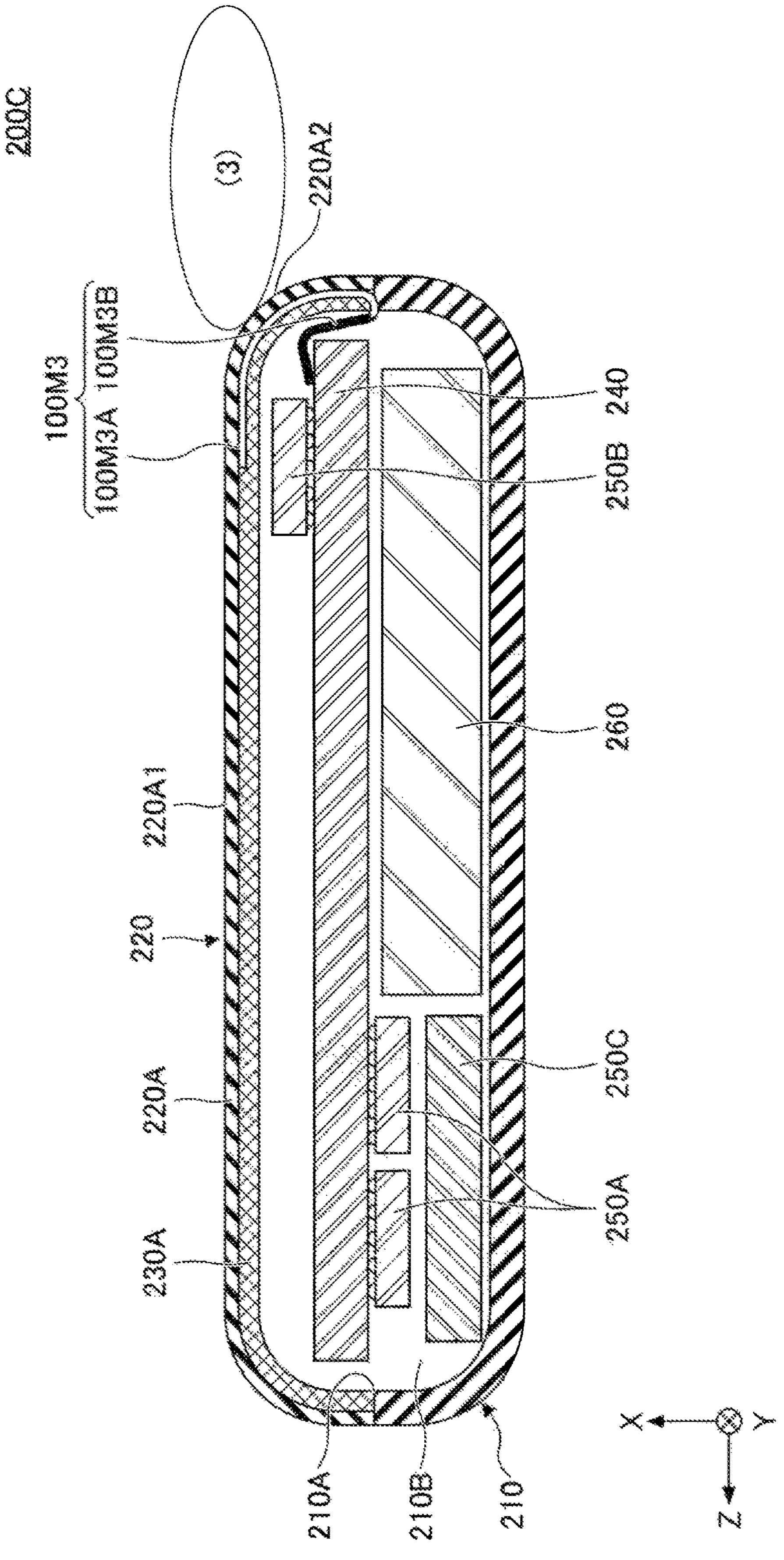
FIG. 37 is a drawing illustrating an electronic apparatus 200C according to a modified embodiment of the embodiment.

FIG. 37 is a drawing illustrating an electronic apparatus 200C according to a modified embodiment of the embodiment. The electronic apparatus 200C includes the antenna device 100M3 (see FIGS. 29A and 29B) having the directivity in the backfire direction instead of the antenna device 100 of the electronic apparatus 200A illustrated in FIG. 11.

The antenna device 100N3 is provided in such a manner that the bent portion of the antenna device 100M3 is situated on the rear side of the curved portion 220A2 of the transparent cover 220A on the −Z direction side, and the antenna device 100M3 can radiate electromagnetic waves in the direction indicated by (3) and can receive electromagnetic waves in the direction indicated by (3). The direction indicated by (3) is the direction in which radiation is emitted from the curved portion 220A2 of the transparent cover 220 of the electronic apparatus 200A toward the outside of the electronic apparatus 200A. Since the antenna device 100M3 has the directivity oriented in the direction (3), the antenna device 100M3 can communicate with a communication device external to the electronic apparatus 200A.

Thus, when the antenna device 100M3 having the directivity in the direction of the backfire is provided on the rear side of the curved portion 220A2 of the transparent cover 220A, the directivity toward the outside further away from the transparent cover 220 and the housing 210 can be obtained.

Figure 38:
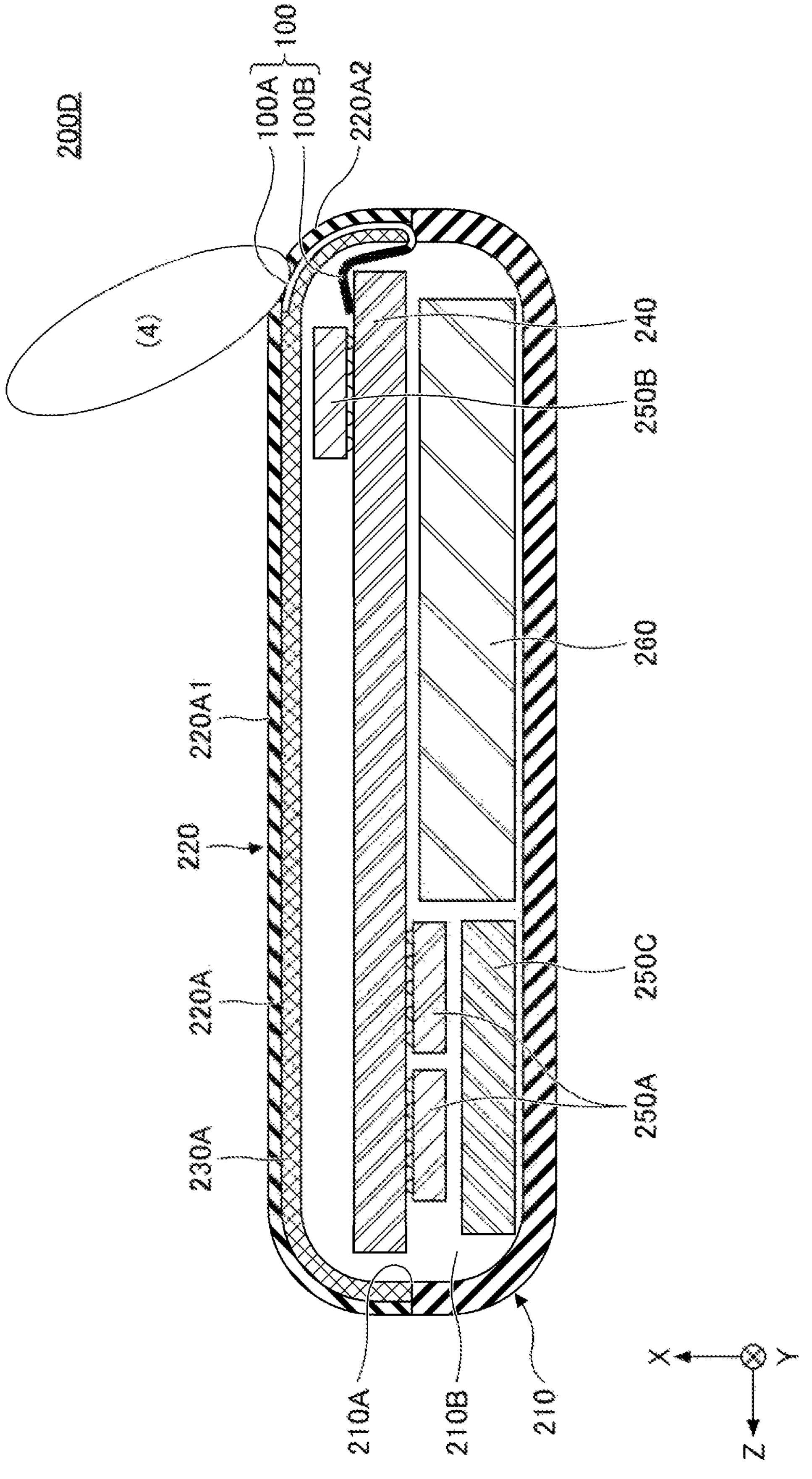
FIG. 38 is a drawing illustrating an electronic apparatus 200D according to a modified embodiment of the embodiment.

FIG. 38 is a drawing illustrating an electronic apparatus 200D according to a modified embodiment of the embodiment. The electronic apparatus 200D is obtained by changing the antenna device 100M3 of the electronic apparatus 200C illustrated in FIG. 37 to the antenna device 100 illustrated in FIGS. 4 and 5. The antenna device 100 has the directivity in the direction of the endfire.

The antenna device 100 is provided so as to be gently bent between the portions 100A and 100B on the rear side of the curved portion 220A2 of the transparent cover 220A on the −Z direction side, and the antenna device 100 can radiate electromagnetic waves in the direction indicated by (4) and can receive electromagnetic waves in the direction indicated by (4). The direction indicated by (4) is the direction in which radiation is emitted from the upper surface portion 220A1 and the curved portion 220A2 of the transparent cover 220 of the electronic apparatus 200A toward the outside of the electronic apparatus 200A. Since the antenna device 100 has the directivity oriented in the direction (4), the antenna device 100 can communicate with a communication device external to the electronic apparatus 200A.

Thus, when the antenna device 100 having the directivity in the direction of the endfire is provided on the rear side of the curved portion 220A2 of the transparent cover 220A, the directivity toward the outside further away from the transparent cover 220 and the housing 210 can be obtained.

Although the antenna device according to the exemplary embodiment of the present invention has been described hereinabove, the present invention is not limited to the particulars of the described embodiment, and various modifications and changes can be made without departing from the subject matter of the claims.

What is claimed is:

1. An electronic apparatus, comprising:

a display panel;

a transparent cover;

a flexible substrate positioned on an inner surface side of the transparent cover;

an antenna element formed on the flexible substrate at a position such that the antenna element is visible from outside of the transparent cover and has a directivity oriented toward an outside of the electronic apparatus; and a feeding line including a ground layer and a transmission line and formed on the flexible substrate such that the feeding line has a predetermined characteristic impedance and is configured to feed power to the antenna element, wherein the flexible substrate is bent at a position between an end of the antenna element and an end portion of the ground layer on a side away from the antenna element, the flexible substrate is transparent, and at least two opposite end portions of the flexible substrate are each positioned behind both the transparent cover and the display panel.

2. The electronic apparatus according to claim 1, wherein the antenna element is configured to attain a transmittance of a predetermined value or higher.

3. The electronic apparatus according to claim 1, wherein the directivity of the antenna element is an endfire direction, and the endfire direction is oriented toward the outside of the electronic apparatus.

4. The electronic apparatus according to claim 3, wherein the endfire direction is a direction in which radiation is emitted from the outer surface of the transparent cover.

5. The electronic apparatus according to claim 1, wherein the directivity of the antenna element is a backfire direction such that the backfire direction is oriented toward the outside of the electronic apparatus.

6. The electronic apparatus according to claim 5, wherein the backfire direction is a direction in which radiation is emitted from the outer surface of the transparent cover.

7. The electronic apparatus according to claim 4, wherein the transparent cover includes a curved portion curved in a three-dimensional shape, and the display panel is curved along the inner surface of the transparent cover that is curved such that the flexible substrate has a portion that is curved on a rear side of the curved portion of the display panel.

8. The electronic apparatus according to claim 1, wherein the directivity of the antenna element is a direction in which radiation is emitted from a surface of the flexible substrate.

9. The electronic apparatus according to claim 8, wherein a section of the flexible substrate in which the antenna element is formed is positioned along the inner surface of the transparent cover, and the directivity of the antenna element is a direction in which radiation is emitted from the outer surface of the transparent cover.

10. The electronic apparatus according to claim 4, wherein a section of the feeding line that is formed at a position visible from the outside of the transparent cover is transparent.

11. The electronic apparatus according to claim 10, wherein the section of the feeding line that is formed at the position visible from the outside of the transparent cover includes a conductive line formed in a mesh form and is configured to attain a transmittance of a predetermined value or higher.

12. The electronic apparatus according to claim 4, wherein a section of the feeding line that is formed at a position not visible from the outside of the transparent cover includes the transmission line including a pair of conductive layers formed on surfaces of the flexible substrate and including a plurality of conductors in a column or tube shape penetrating the flexible substrate and connecting the pair of conductive layers, and the transmission line is shielded by the pair of conductive layers and the plurality of conductors in the column or tube shape.

13. The electronic apparatus according to claim 1, wherein the transparent cover includes a curved portion curved in a three-dimensional shape, the display panel is curved along the inner surface of the transparent cover, the flexible substrate is positioned between the transparent cover and the display panel such that the flexible substrate is covering an entirety of a display surface of the display panel, and an edge of the flexible substrate is positioned on a rear side of the display panel when seen from the outer surface of the transparent cover.

14. The electronic apparatus according to claim 1, wherein the antenna element is a dipole antenna, a Vivaldi antenna, a Yagi-Uda antenna, a monopole antenna, a tapered slot antenna, a slot antenna, or a log periodic antenna.

15. The electronic apparatus according to claim 1, further comprising one or more parasitic elements configured to be fed by the antenna element such that the directivity oriented toward the outside of the electronic apparatus is achieved by the antenna element and the one or more parasitic elements.

16. The electronic apparatus according to claim 1, wherein the antenna element includes a dipole antenna.

17. The electronic apparatus according to claim 1, further comprising conductive lines formed in mesh forms and having line widths in a range of 1 μm to 10 μm and line gaps of 300 μm to 500 μm.

18. The electronic apparatus according to claim 1, further comprising conductive lines formed in mesh forms and having an aperture ratio of 80% or more.

19. The electronic apparatus according to claim 1, further comprising conductive lines formed in mesh forms and having line widths in a range of 1 μm to 10 μm, line gaps of 300 μm to 500 μm and an aperture ratio of 80% or more.

20. The electronic apparatus according to claim 1, a wherein the feeding line has a section comprising a conductive line formed in a mesh form.

21. The electronic apparatus according to claim 1, wherein the at least two opposite end portions of the flexible substrate are each spaced apart from both the transparent cover and the display panel.

22. The electronic apparatus according to claim 1, wherein the flexible substrate includes a middle portion between the at least two opposite end portions of the flexible substrate, the middle portion of the flexible substrate is positioned between the transparent cover and the display panel, and the middle portion of the flexible substrate is in direct contact with both the transparent cover and the display panel.

* * * * *